(12) United States Patent
Ryu et al.

(10) Patent No.: US 12,028,146 B2
(45) Date of Patent: Jul. 2, 2024

(54) GROUPING OF BEAMS BY USER EQUIPMENT

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Hua Wang, Basking Ridge, NJ (US); Juan Montojo, San Diego, CA (US); Peter Gaal, San Diego, CA (US); Jing Sun, San Diego, CA (US); Xiaoxia Zhang, San Diego, CA (US); Arumugam Chendamarai Kannan, San Diego, CA (US); Piyush Gupta, Bridgewater, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/168,056

(22) Filed: Feb. 4, 2021

(65) Prior Publication Data
US 2022/0247477 A1 Aug. 4, 2022

(51) Int. Cl.
*H04B 7/08* (2006.01)
*H04W 16/28* (2009.01)
(Continued)

(52) U.S. Cl.
CPC ............ *H04B 7/088* (2013.01); *H04W 16/28* (2013.01); *H04W 72/02* (2013.01);
(Continued)

(58) Field of Classification Search
CPC ...... H04B 7/088; H04W 16/28; H04W 72/02; H04W 72/0406; H04W 72/046; H04W 74/0808
See application file for complete search history.

(56) References Cited

U.S. PATENT DOCUMENTS 10,720,978 B1 * 7/2020 Sun ..................... H04L 5/0073
2016/0302202 A1 * 10/2016 Lyu ..................... H04B 7/0617
(Continued)

FOREIGN PATENT DOCUMENTS

EP 3404845 A1 11/2018
EP 3631997 A1 4/2020
(Continued)

OTHER PUBLICATIONS

International Search Report and Written Opinion dated May 9, 2022 from corresponding PCT Application No. PCT/US2021/065574.

*Primary Examiner* — Ivan O Latorre
(74) *Attorney, Agent, or Firm* — Arun Swain

(57) ABSTRACT

The present disclosure provides systems, methods, and apparatuses for grouping beams that are directionally associated with one another and associating respective properties associated with groups of beams. In one aspect, a UE or component thereof may be configured to select a first beam group of one or more beam groups to include a first beam of a set of beams, with the first beam group including a first subset of beams of the set of beams that is directionally associated with a first direction of the first beam. The UE or component thereof may be further configured to associate a respective set of properties with each of the one or more beam groups. The UE or component thereof be configured to communicate via the first beam of the first beam group of the one or more beam groups.

26 Claims, 13 Drawing Sheets

(51) Int. Cl.
*H04W 72/02* (2009.01)
*H04W 72/044* (2023.01)
*H04W 72/20* (2023.01)
*H04W 74/0808* (2024.01)

(52) U.S. Cl.
CPC ......... *H04W 72/046* (2013.01); *H04W 72/20* (2023.01); *H04W 74/0808* (2013.01)

(56) References Cited

U.S. PATENT DOCUMENTS

| | | | |
|---|---|---|---|
| 2019/0356398 A1* | 11/2019 | Kim | H04W 24/08 |
| 2019/0393944 A1* | 12/2019 | Huang | H04B 7/0639 |
| 2020/0052803 A1* | 2/2020 | Deenoo | H04B 17/318 |
| 2020/0358509 A1* | 11/2020 | Wernersson | H04L 5/0051 |
| 2021/0329596 A1* | 10/2021 | Freda | H04W 72/542 |
| 2023/0058492 A1* | 2/2023 | Wang | H04L 5/001 |

FOREIGN PATENT DOCUMENTS

| | | |
|---|---|---|
| WO | 2019/160973 A1 | 8/2019 |
| WO | WO-2019160973 A1 * | 8/2019 |

\* cited by examiner

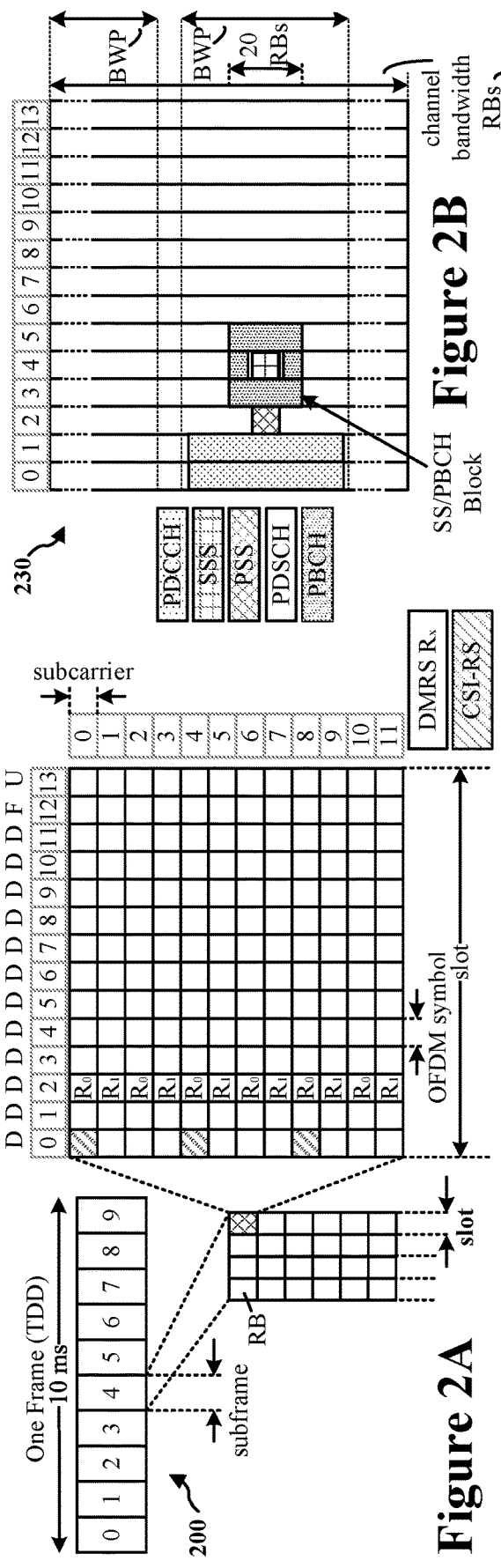
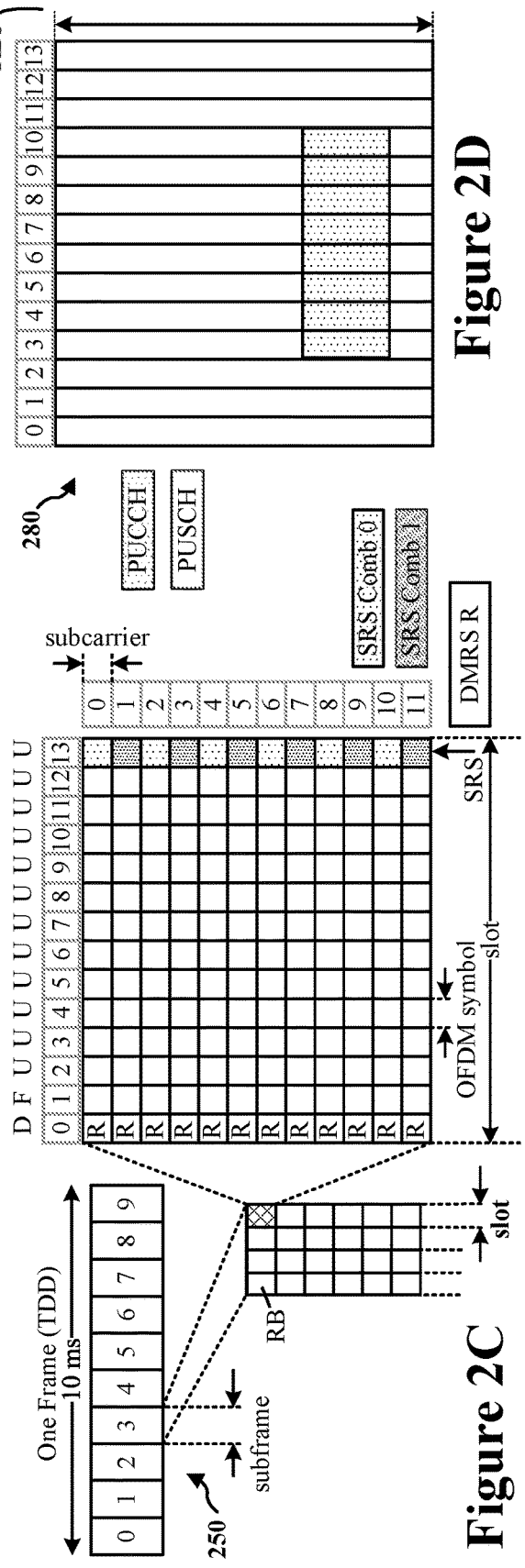

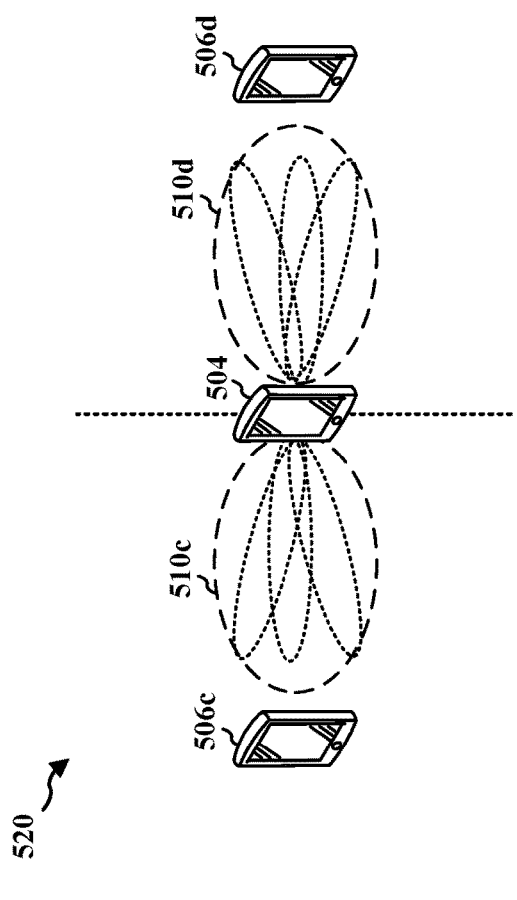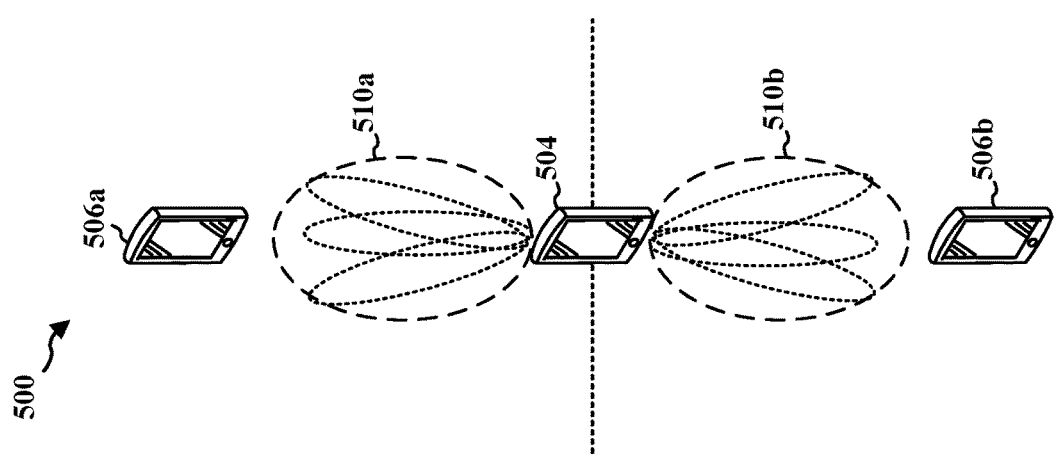
Figure 5

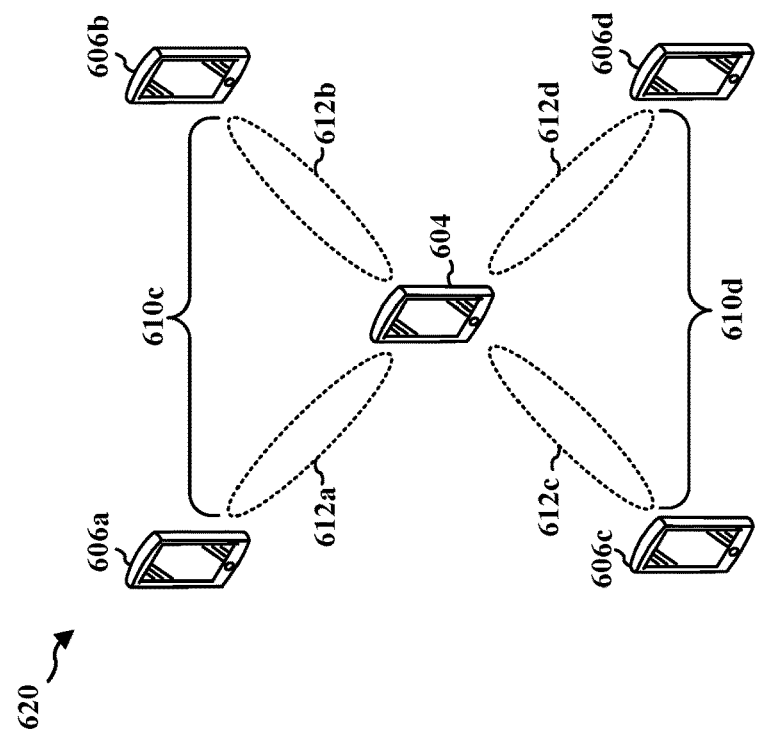
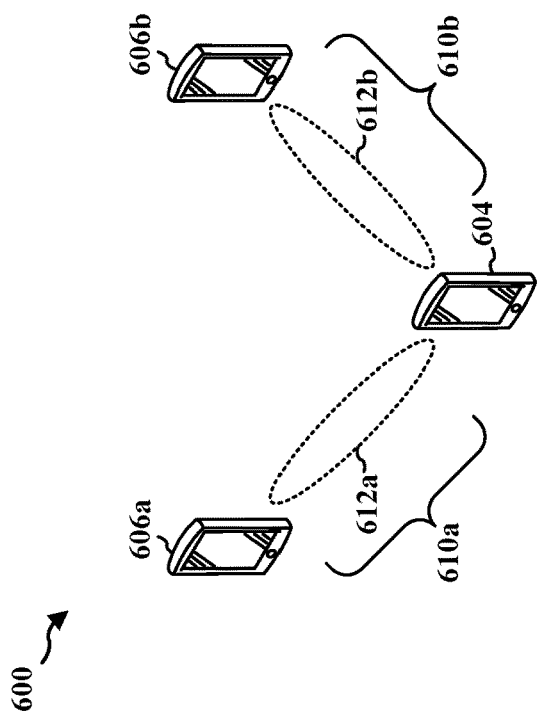
Figure 6

GROUPING OF BEAMS BY USER EQUIPMENT

TECHNICAL FIELD

This disclosure relates to wireless communication systems, including a user equipment (UE) configured to group directionally associated beams together in beam groups.

DESCRIPTION OF THE RELATED TECHNOLOGY

The following presents a simplified summary of one or more aspects in order to provide a basic understanding of such aspects. Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The systems, methods, and devices described in the present disclosure each has several innovative aspects. The desirable attributes of the systems, methods, and devices are not necessarily attributable to a single innovative aspect. Rather, one or more of the desirable attributes of the systems, methods, and devices described herein may be realized through one or more connections, interactions, or other relationships between two or more aspects described with respect to the systems, methods, and devices.

One innovative aspect of the subject matter described in the present disclosure may be implemented as a method of wireless communication by a user equipment (UE). The method may include selecting a first beam group of a plurality of beam groups to include a first beam of a set of beams. The first beam group may include a first subset of beams of the set of beams that is directionally associated with a first direction of the first beam. In addition, the method may include associating a respective set of properties with each of the plurality of beam groups. Further, the method may include communicating via the first beam of the first beam group of the plurality of beam groups.

Another innovative aspect of the subject matter described in the present disclosure may be implemented by an apparatus. The apparatus may various means configured to perform various functions described in the present disclosure. The apparatus may include means for selecting a first beam group of a plurality of beam groups to include a first beam of a set of beams. The first beam group may include a first subset of beams of the set of beams that is directionally associated with a first direction of the first beam. In addition, the apparatus may include means for associating a respective set of properties with each of the plurality of beam groups. Further, the apparatus may include means for communicating via the first beam of the first beam group of the plurality of beam groups.

A further innovative aspect of the subject matter described in the present disclosure may be implemented as an apparatus including a memory and at least one processor coupled to the memory. The at least one processor may be configured to select a first beam group of a plurality of beam groups to include a first beam of a set of beams. The first beam group may include a first subset of beams of the set of beams that is directionally associated with a first direction of the first beam. In addition, the at least one processor may be configured to associate a respective set of properties with each of the plurality of beam groups. Further, the at least one processor may be configured to communicate via the first beam of the first beam group of the plurality of beam groups.

Still another innovative aspect of the subject matter described in the present disclosure may be implemented in a computer-readable medium storing computer-executable code, which may be executed by a processor. The code, when executed by the processor, may cause the processor to select a first beam group of a plurality of beam groups to include a first beam of a set of beams. The first beam group may include a first subset of beams of the set of beams that is directionally associated with a first direction of the first beam. In addition, the code, when executed by the processor, may cause the processor to associate a respective set of properties with each of the plurality of beam groups. Further, the code, when executed by the processor, may cause the processor to communicate via the first beam of the first beam group of the plurality of beam groups.

Details of one or more implementations of the subject matter described in the present disclosure are set forth in the accompanying drawings and the description below. Other features, aspects, and advantages provided by the present disclosure are apparent from the description, the accompanying drawings, the claims, or some combinations thereof. Note that the relative dimensions illustrated in the accompanying figures may not be drawn to scale.

BRIEF DESCRIPTION OF THE DRAWINGS

FIG. 2A is a diagram illustrating an example of a first frame.

FIG. 2B is a diagram illustrating an example of downlink channels within a subframe.

FIG. 2C is a diagram illustrating an example of a second frame.

FIG. 2D is a diagram illustrating an example of uplink channels within a subframe.

FIG. 5 is a diagram illustrating example scenarios in which a UE selects a respective beam group of one or more beam groups to include each of a set of beams of the UE.

FIG. 6 is a diagram illustrating other example scenarios in which a UE selects a respective beam group of one or more beam groups to include each of a set of beams of the UE.

As shown in the present disclosure and accompanying drawings, like reference numbers and designations indicate like elements.

DETAILED DESCRIPTION

Figure 1:
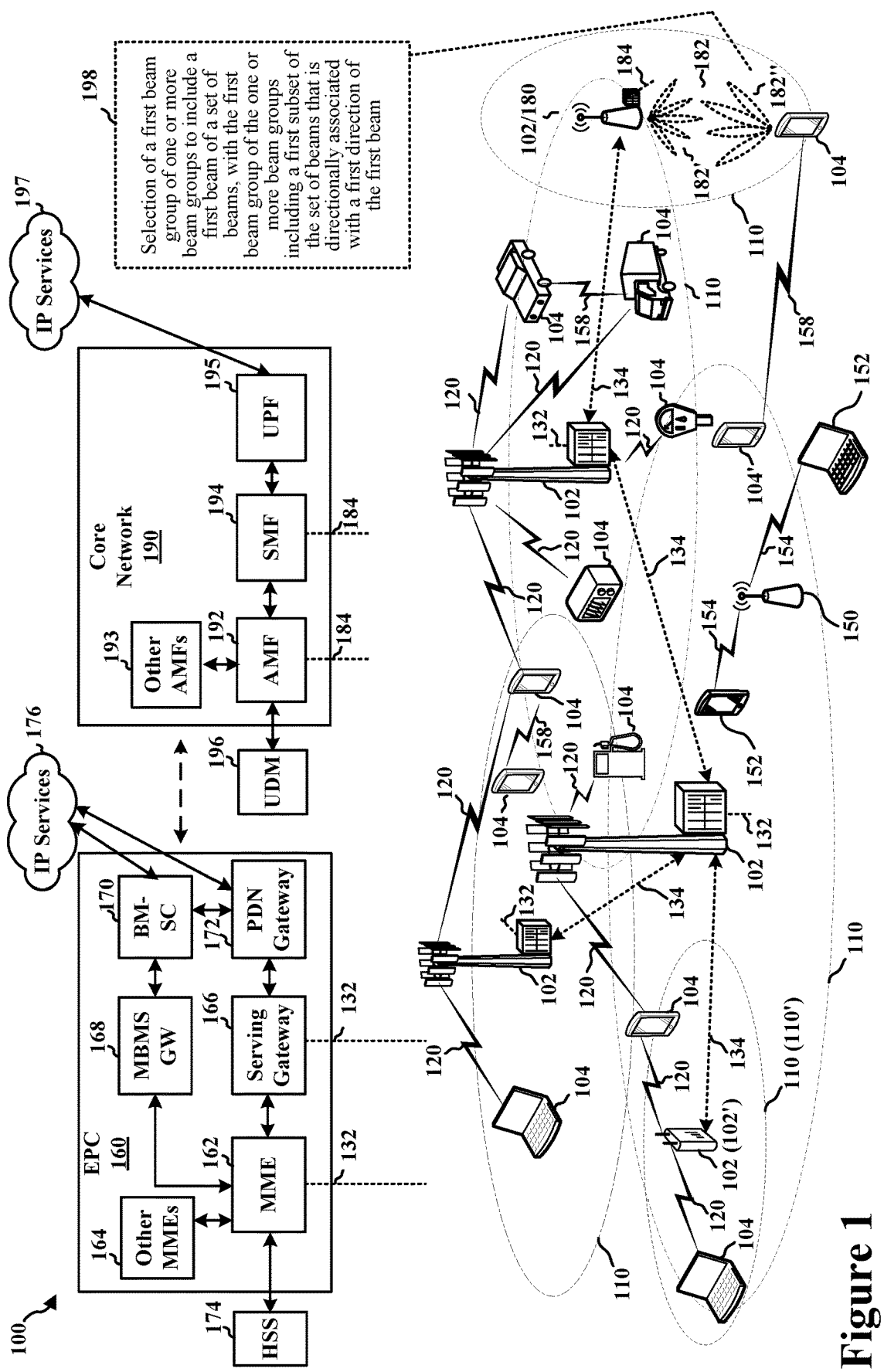
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Advanced Mobile Phone System (AMPS), Long Term Evolution (LTE) and various extensions thereof (such as LTE-Advanced (LTE-A) and LTE-License Assisted Access (LTE-LAA)), New Radio (NR), or other known signals that are used to communicate within a wireless, cellular or internet of things (IOT) network, such as a system utilizing 3G, 4G or 5G, or further implementations thereof, technology.

When operating in some wireless networks, such as various access networks, a user equipment (UE) may communicate using beamforming to communicate signals in a millimeter wave (mmW) (or near-mmW) frequency range, such as Frequency Range 2 (FR2) specified by a 5G NR radio access technology (RAT). With beamforming, the UE may use beams to communicate (such as by transmitting or receiving) signals in particular directions. For example, the UE directionally beamform some communication by applying the same spatial filter or other parameters used for at least one reference signal (RS) to such communication.

As beams may be used to communicate in various directions, different channel properties (such as channel conditions) may be observed on different beams, and therefore, different channel properties (such as coding rate, modulation order, transport block size, and so forth) may be applicable to different beams. Illustratively, properties of a channel may include at least one of a channel busy ratio (CBR), a channel occupancy ratio (CR), or a CR threshold. Potentially, at least one of a first CBR, a first CR, or a first CR threshold may be associated with a channel on which communication flows from the UE to at least one apparatus, such as a channel on which the UE transmits data or control information to the at least one apparatus. However, at least one of a second CBR, a second CR, or a second CR threshold may be associated with another channel on which communication flows to the UE from at least one other apparatus, such as a channel on which the UE receives data or control information from the at least one other apparatus. For example, the at least one of the first CBR, the first CR, or the first CR threshold may be different from the at least one of the second CBR, the second CR, or the second CR threshold, respectively, when channel reciprocity is absent between the UE and the at least one apparatus.

A CBR of a channel may be a function of "busy" or otherwise unavailable resources on the channel and the total resources on the channel. For example, the CBR may be approximately equal to the quotient of the busy resources on the channel observed by the UE divided by the total resources on the channel potentially available to the UE.

A CR of a channel may be a function of resources on the channel used by the UE and the total resources on the channel. For example, the CR may be approximately equal to the quotient of the resources on the channel used by the UE divided by the total resources on the channel potentially available to the UE.

A CR threshold may be implemented as a mechanism for congestion control by the UE. As the CR may provide information indicating the amount of resources consumed by communication by the UE relative to the total resources on the channel potentially available to the UE, the UE may use the CR to reduce or prevent consumption of an amount of available resources by the UE that adversely affects some other apparatuses using some or all of the same or adjacent resources. For example, the UE may compare the CR with the CR threshold in order to evaluate whether the UE is approaching or consuming an amount of available resources on the channel beyond which an apparatus that is proximate to the UE may experience appreciable interference from the UE or an apparatus may be unable to find or schedule resources for communication. Thus, the UE may refrain from communicating on a portion, percentage, or ratio of the total available resources that satisfies (such as by meeting or exceeding) the CR threshold.

In some aspects, the UE may use one or more channel properties, such as at least one of the CBR, the CR, or CR threshold in order to select a channel on which to communicate. For example, the UE may observe a higher CBR on one channel than on another channel, and therefore, the UE may communicate on the channel having the lower the CBR. In another example, the UE may calculate a higher CR on one channel than on another channel (such as a higher CR approaching the CR threshold associated with the channel), and therefore, the UE may select the channel having the lower CR on which to communicate.

In some instances, channel properties associated with one beam may be similar to channel properties associated with one or more other beams, such as when the one beam is directionally associated with a direction of the one or more other beams. For example, signals communicated by the UE via the one beam may experience a similar environment (such as similar interference) as signals communicated by the UE via the one or more other beams. In some other instances, beams that are directionally associated with one another may affect communication thereby, such as with lobes of one beam that may "leak" into lobes of one or more other beams, and so causing unintentional interference due to antenna characteristics.

Thus, as a result of at least one of similar channel properties or inter-beam effects (such as leakage), beams may be grouped together by the UE. In particular, the UE may group together beams that are directionally associated with one another—for example, beams may be directionally associated with one another when the respective main lobes are relatively proximate, when the respective main lobes share at least one common direction (such as in at least one of a global coordinate frame or a reference coordinate frame relative to the UE), when leakage between beams is possible or likely, and the like.

However, beams that are actively used by the UE may dynamically change over time, such as when the UE is mobile, when the UE experiences a change in orientation, when a beam via which the UE communicates becomes blocked, when the UE begins or ends communication with another apparatus (such as a base station, another UE, etc.), and so forth. Therefore, statically grouping beams, such as when the UE is powered on or effectively any time prior to which the UE is able to estimate conditions of a channel on which to communicate, may be inefficient, impractical, or otherwise undesirable.

Notwithstanding the aforementioned issues with static beam grouping, a UE may derive some benefit from grouping together subsets of beams of a set of beams, such as increased efficiency, more reliable communication, lower latency, and so forth, when beam groups are configured in such a way that a respective set of properties associated with each of the beam groups can be accurately applied to a respective subset of beams included in each of the beam groups.

Various innovative aspects related to dynamically grouping beams together by a UE are provided. The UE may dynamically group together beams that are directionally associated with one another, which may be dynamically evaluated in connection with the dynamic grouping of beams such that the UE is able to associate or apply a respective set of properties to each beam group in a manner that does not adversely affect beamformed communication by the UE. In so doing, the UE may reduce processing capacity, power consumption, latency, or may experience one or more other benefits from associating or applying sets of properties at a beam-group level as opposed to a beam level, which may be more computationally expensive, less power conservative, or otherwise less beneficial in comparison to association or application of sets of properties at a beam-group level.

According to some innovative aspects of the present disclosure, the set of beams to be respectively assigned to beam groups may include beams that the UE is actively using. According to some examples, beams may be actively used when used for communication of at least one of control information, data, or feedback, or when used for beam training, such as communication of RSs that may be used to locate (or quasi-collocate) one or more beams (including characteristics or properties thereof) via which at least one of control information, data, or feedback is to be communicated.

Furthermore, the present disclosure describes various innovative aspects related to associating respective sets of properties with groups of beams, with a set of properties being applicable to or computed using beams of a beam group. For example, various techniques and approaches are provided for associating at least one respective CBR, at least one respective CR, or at least one respective CR threshold with a respective subset of beams grouped together in each of the groups of beams, such that the at least one respective CBR, at least one respective CR, or at least one respective CR threshold is associated with a beam group having beams to which the at least one respective CBR, at least one respective CR, or at least one respective CR threshold may be applicable or may be derived from. In some aspects, the UE may compute a first CBR associated with one channel, a first CR associated with the one channel, or a first CR threshold associated with the one channel. In addition, the UE may compute a second CBR associated with another channel, a second CR associated with the other channel, or a second CR threshold associated with the other channel. Accordingly, a UE configured to dynamically make communication decisions (such as regarding which beam(s) to use for communication at a given time) at a level that is relatively higher than beam-level is provided for herein.

Particular implementations of the subject described in the present disclosure can be implemented to realize one or more potential advantages, which will be apparent from the present disclosure or to one having ordinary skill in the art. Some non-limiting potential advantages are provided in the following innovative aspects (although the inclusion and order of the following innovative aspects does not expressly or impliedly convey any qualitative assessment or relative comparison thereof). According to some innovative aspects described herein, selecting at least one respective beam group to include a respective subset of beams that are directionally associated with one another may cause or contribute to a reduction in overhead upon a UE. For example, association or application of at least one property with all beams of the subset of beams included in the beam group (such as by using a representative beam or beams of the subset of beams) may reduce consumption of or load on at least one of at least one of a processor, power source, or memory unit relative to association or application of the at least one property for each of the set of beams individually.

According to some other innovative aspects described herein, selecting at least one respective beam group to include a respective subset of beams that are directionally associated with one another may cause or contribute to a reduction in latency experienced or caused by the UE when communicating via at least one beam of the beam group. For example, latency in some communication that involves the UE may be reduced at least partially in connection with grouping together beams that are directionally associated with one another, as at least one of beamforming time (such as beam identification, beam selection, and the like) or the aforementioned reduction in overhead may be reduced.

According to some further innovative aspects described herein, selecting at least one respective beam group to include a respective subset of beams that are directionally associated with one another may cause or contribute to mitigation of errors and interference, such as reduction in at least one of collisions or interference to which the UE might have otherwise contributed. Specifically, the UE may use at least one property associated with the subset of beams included in the beam group to evaluate whether the UE is using an amount or number of resources on a channel that may adversely impact other communication between other apparatuses proximate to the UE, such as through resource collision and other interference on resources of or adjacent to the channel, as well as communication by the UE, such as by increasing an error rate or otherwise adversely affecting a reliability metric. Thus, the UE may determine whether the resource usage of a channel on which the UE communicates via a first beam of the beam group satisfies a threshold at which collision or interference on the channel is appreciably increased and, if so, the UE may refrain from communicating via the beam group. As the UE may address whether to continue using resources of a channel at a beam-group level, refraining from communicating via the first beam of the beam group may also be enforced for other beams of the beam group, which may prevent circumvention of congestion control by the UE (such as at a relatively lower layer of the UE that reselects another beam of the beam group when the first beam fails). That is, the UE may reduce or cease communication on the channel via any beam of the beam group that is directionally associated with the direction of the first beam, and in so doing, the amount or number of unused or open resources may increase. Such congestion control may be applicable in the context of communication in various wireless communication environments, as the UE yields resources in order to reduce collisions and other interference affecting other apparatuses operating on resources at least partially overlapping or adjacent to resources on which the UE communicates, as well as increase the reliability of communication on a link between the UE and another apparatus.

With reference to FIG. 1, a diagram illustrates an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (such as an S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (such as handover, dual connectivity, and the like), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as an X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include at least one of uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including at least one of spatial multiplexing, beamforming, or transmit diversity. The communication links may be through one or more carriers. The base stations 102/UEs 104 may use spectrum up to Y megahertz (MHz) (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as when the number carriers are allocated for DL is unequal to that allocated for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as at least one of a physical sidelink broadcast channel (PSBCH), a physical sidelink discovery channel (PSDCH), a physical sidelink shared channel (PSSCH), a physical sidelink control channel (PSCCH), or a physical sidelink feedback channel (PSFCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, such as in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in at least one of a licensed frequency spectrum or an unlicensed frequency spectrum. When operating in an unlicensed frequency spectrum, the small cell 102' may employ NR and use the same unlicensed frequency spectrum (such as a spectrum encompassing or at least partially overlapping with 5 GHz or other similar spectrum relatively proximate or contiguous in the frequency domain with 5 GHz, 6 GHz, or 7 GHz) as used by the Wi-Fi AP 150. The small cell 102', employing NR in an unlicensed frequency spectrum, may boost coverage to or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" or "mmW" band in documents and articles, despite being different from the extremely high frequency (EHF) band (30 GHz-300 GHz) which is identified by the International Telecommunications Union (ITU) as a "millimeter wave" or "mmW" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the terms "millimeter wave," "mmW," or other term(s) having the same or similar the like used herein may broadly represent frequencies that may include mid-band frequencies, may be within FR2, or may be within the EHF band.

A base station 102, whether a small cell 102' or a large cell (such as a macro base station), may be configured to connect the UE 104 with at least one of the EPC 160 or the core network 190, and may be referred to as an eNB, gNodeB (gNB), or another type of base station. Some base stations, such as a gNB 180, may operate in at least one of a traditional sub 6 GHz spectrum, mmW frequencies, or near-mmW frequencies in communication with the UE 104. When the gNB 180 operates in mmW or near-mmW frequencies, the gNB 180 may be referred to as a mmW base station. The mmW base station 180 may utilize beamforming 182 with the UE 104 to compensate for the path loss and short range. The base station 180 and the UE 104 may each include a set of antennas, such as antenna elements, antenna panels, or antenna arrays, to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and potentially, other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and potentially, one or more other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104 may be configured to communicate with at least one of the base station 102/180 or another UE 104' utilizing beamforming 182 in one or more directions 182". The UE 104 may be configured for selection of a first beam group of one or more beam groups to include a first beam of a set of beams, with the first beam group of the one or more beam groups including a first subset of beams of the set of beams that is directionally associated with a first direction of the first beam (198).

The UE 104 may be further configured to associate a respective set of properties with each of the one or more beam groups. The UE 104 may be configured to communicate with at least one other apparatus via the first beam of the first beam group of the one or more beam groups. For example, the UE 104 may communicate on at least one of an uplink channel(s) or downlink channel(s) with the base station 102/180. Additionally or alternatively, the UE 104 may be configured to communicate via the first beam of the first beam group of the one or more beam groups on at least one sidelink channel with the other UE 104'.

Various aspects associated with dynamically grouping beams are further described herein. Although the present disclosure may focus on 5G NR, the concepts and various aspects described herein may be applicable to other similar areas, such as LTE, LTE-A, CDMA, GSM, or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description herein applies also to a 5G NR frame structure that is TDD.

Other wireless communication technologies may differ from one or more RATs referenced herein, such as 5G NR, with respect to at least one of frame structure, channels (such as allocation of resources to different channels), or other configuration. A frame, which may be approximately 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot or RS for the UE. In some configurations, an RS may include at least one demodulation RS (DM-RS) (indicated as $R_x$ for one particular configuration, where 100× is the port number, but other DM-RS configurations are possible) or at least one channel state information (CSI) RS (CSI-RS) for channel estimation at the UE, although some RSs may include DM-RSs while some other RSs may include CSI-RSs. In some other configurations, an RS may additionally or alternatively include at least one beam measurement (or management) RS (BRS), at least one beam refinement RS (BRRS), or at least one phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located in one or more other frequency ranges across the channel bandwidth that may be greater, lower, or both greater and lower than the range in which the CORESET is located. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry at least one of a buffer status report (BSR), a power headroom report (PHR), or UCI.

Figure 3:
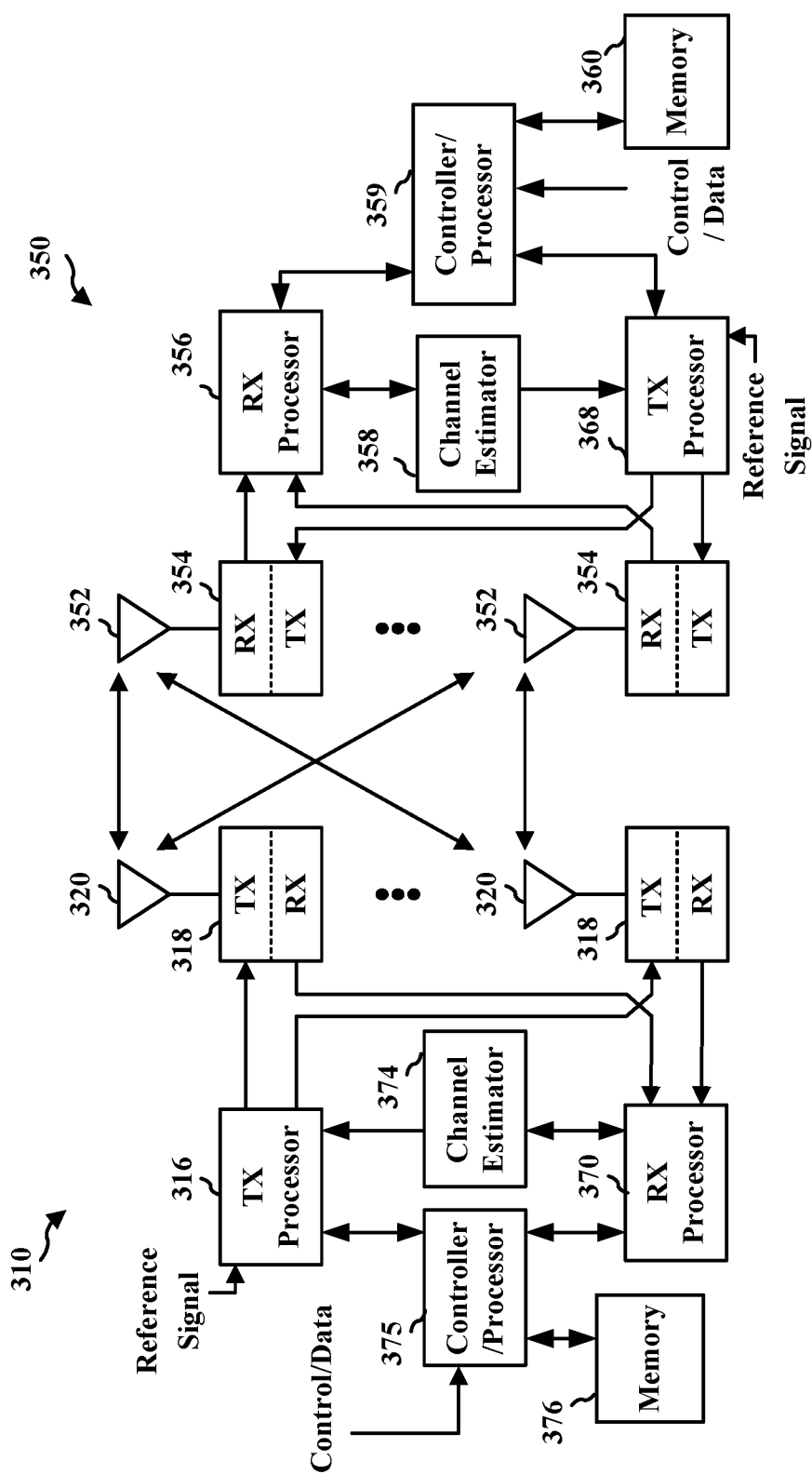
FIG. 3 is a diagram illustrating an example of a base station (BS) and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as an MIB, SIBs, and the like), RRC connection control (such as RRC connection paging, RRC connection establishment, RRC connection modification, and RRC connection release), inter RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in at least one of the time domain or the frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from at least one of an RS or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using a protocol for feedback messaging, which may support some HARQ processes or HARQ-related operations. For example, a protocol for feedback messaging may specify various procedures and implementations to be observed when communicating feedback messages in response to transmissions, such as with ACK messaging, NACK messaging, or both ACK and NACK messaging.

Similar to the functionality described in connection with the DL transmission by the base station 310, the controller/processor 359 provides RRC layer functionality associated with system information (such as a MIB, SIBS, and the like) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using a protocol for feedback messaging, which may support HARQ operations. Feedback messaging and related protocols may include ACK messaging for a receiver side to acknowledge reception of a transmission to a transmitter side (additionally or alternatively, ACK messaging may convey some level of success to the transmitter side related to decoding or other processing of the transmission at L1 or L2 of the receiver side), NACK messaging to indicate to a transmitter side that a transmission is missing at the receiver side (additionally or alternatively, NACK messaging may convey failure to the transmitter side related to decoding or other processing of the transmission at L1 or L2 of the receiver side), or both ACK and NACK messaging.

In some aspects, at least one of the TX processor 368, the RX processor 356, and the controller/processor 359 may be configured to perform aspects in connection with (198) of FIG. 1.

Figure 4:
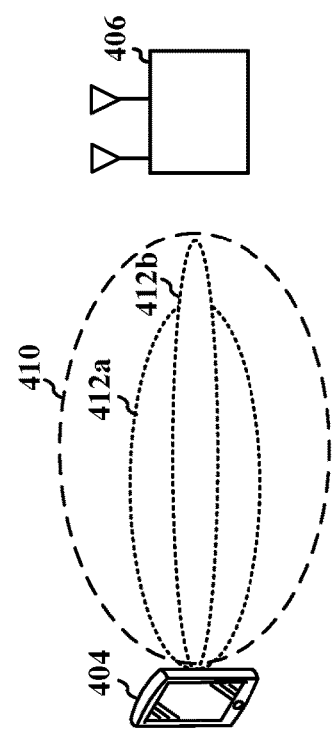
FIG. 4 is a diagram illustrating an example UE configured for beamforming.

FIG. 4 is a diagram illustrating an example of a UE 404 configured to communicate using beamforming. For example, the UE 404 may be configured to communicate using beamforming with at least one other apparatus 406, such as another UE, a base station (such as a gNB or small cell), a relay device, or another similar apparatus configured for wireless communication.

At any given time, the UE 404 may be configured with a set of beams, including a first beam 412a and a second beam 412b, for such beamformed communication with the at least one other apparatus 406. The set of beams with which the UE 404 is configured at a given time may be considered to be "active" beams or "actively used" beams.

Each of the first beam 412a and the second beam 412b may be considered active when used for communication (including transmission or reception) of at least one of data, control information, or feedback. According to one example, when the at least one other apparatus 406 includes a UE, each of the first beam 412a and the second beam 412b may be considered active when used for communication (such as transmission or reception) on at least one of a PSSCH, PSCCH, or PSFCH. According to another example, when the at least one other apparatus 406 includes a base station, each of the first beam 412a and the second beam 412b may be considered active when used for communication on at least one of a PDSCH, PDCCH, PUSCH, or PUCCH. According to a further example, each of the first beam 412a and the second beam 412b may be considered active when used for beam training, including transmission or reception of a set of RSs. In some aspects, a set of RSs may include a set of CSI-RSs, which may be used for communication of at least one of data, control information, or feedback after beam training.

The UE 404 may be capable of activating and deactivating different beams at different times. For example, the UE 404 may activate or deactivate one or more beams according to the mobility of the UE 404, the orientation of the UE 404, the environment surrounding the UE 404, etc. Thus, the set of beams may dynamically change at the UE 404 in a manner that may be unpredictable, or difficult to predict, at the point of manufacture of the UE 404, when the UE 404 is powered on, when the UE 404 attaches to the network, or other time preceding beam activation or deactivation by more than a few minutes (or a few seconds).

In some aspects, when the at least one other apparatus 406 includes a base station, the UE 404 may activate a beam in response to receiving from the at least one other apparatus 406, information indicating a set of RSs corresponding to one or more parameters of the beam on which the set of RSs is to be communicated (such as by transmitting or receiving). In some aspects, the information indicating the set of RSs may be communicated in a relatively lower frequency range, such as FR1, whereas the set of RSs may be communicated in a relatively higher frequency range, such as FR2 or other mmW or near-mmW frequency range. The one or more parameters may include, for example, a spatial filter, beam identifier (ID), transmission configuration indicator (TCI) state, direction, or other parameter(s).

In some other aspects, when the at least one other apparatus 406 includes a UE, the UE 404 may activate a beam in association with (including in response to, contemporaneously with, and so forth) communicating, with the at least one other apparatus 406, information indicating a set of RSs corresponding to one or more parameters of the beam on which the set of RSs is to be communicated. For example, at least one of the first beam 412a or the second beam 412b may be associated with a set of RSs that is communicated with the at least one other apparatus 406, which may include one or more UEs that are known to the UE 404, such as when the UE 404 has already discovered or been discovered on a PSDCH by the known one or more UEs.

The UE 404 may deactivate a beam when the beam is unused for communication (such as transmission or reception) or unused for beam training, including transmission or reception of a set of RSs. For example, the UE 404 may deactivate a beam when the beam is not associated with any RSs, such as by refraining from applying one or more parameters of the beam (such as a spatial filter, beam ID, TCI state, direction, or other parameter(s)) for communication.

In some aspects, the UE 404 may deactivate a beam in association with (such as in response to, contemporaneously with, and so forth) an instruction, request, or other information, such as a message terminating a session or link, that is communicated with the at least one other apparatus 406. In some other aspects, the UE 404 may deactivate a beam in response to an absence of communication using the beam (such as after a timeout period).

According to various aspects of the present disclosure, the UE 404 may select at least one beam group (such as the beam group 410) to include each of a set of active beams of the UE 404. Specifically, the UE 404 may select at least one beam group to include each of a set of active beams of the UE 404 such that the at least one beam group includes a subset of beams that is directionally associated with one another.

In some aspects, the UE 404 may treat the beam group 410 as a channel, with each of the constituent beams 412a and 412b being a respective sub-channel of the channel. The UE 404 may select the at least one beam group by storing information indicating an association between the subset of beams that is directionally associated with one another or by storing information indicating a set of properties that is common to the subset of beams that is directionally associated with one another.

Because the set of beams considered to be active by the UE 404 may dynamically change over time, the UE 404 may dynamically select at least one of one or more beam groups to include each of the set of active beams. Relatedly, whether the UE 404 considers beams of a subset of beams to be directionally associated with one another may dynamically change in association with the set of active beams.

Further, the UE 404 also may dynamically change one or more of the beam groups, such as when the UE 404 activates and deactivates beams to be included in the set of active beams. For example, the UE 404 may split a beam group into two or more beam groups, or the UE 404 may merge two or more beam groups into one beam group.

Illustratively, in the context of FIG. 4, the UE 404 may select the same beam group 410 to include both the first beam 412a and the second beam 412b. The UE 404 may consider the first beam 412a and the second beam 412b to be directionally associated with one another by evaluating a first direction of the first beam 412a and a second direction of the second beam 412b as a common direction (such as in at least one of a global coordinate frame or a reference coordinate frame relative to the UE) or because leakage between the first beam 412a and the second beam 412b is possible or likely.

In some aspects, the UE 404 may include transmission beams in different beam groups than reception beams (even where transmission beams might otherwise be directionally associated with reception beams). In some other aspects, however, the UE 404 may refrain from differentiating between transmission beams and reception beams when selecting beam groups to include active beams, or the UE 404 may select one or more beam groups to include active beams used for both transmission and reception.

The UE 404 may select the same beam group 410 to include both the first beam 412a and the second beam 412b because one or more properties related to the first beam 412a may also be related to the second beam 412b (potentially, the directional association between the first beam 412a and the second beam 412b may imply commonality between the first beam 412a and the second beam 412b for one or more properties). For example, various measurements, channel conditions, or other information associated with the first beam 412a may also be associated with the second beam 412b in connection with the first beam 412a being directionally associated with the second beam 412b.

The UE 404 may associate a respective set of properties with each of the one or more beam groups. According to various aspects, a set of properties may be associated with a beam group through at least one of computation of a property for a beam group, calculation of a property, assignment of a property for a beam group, derivation of a property for a beam group, generating data or metadata that computationally links a property with a beam group (such as internally to the UE 404), or one or more other operations in which the UE 404 establishes or defines a relationship between a set of properties such that the set of properties is identifiably and accessibly related to the beam group (such as with identifiers or other linking data enabling access and application of the set of properties when the beam group is accessed or applied, or enabling access and application of the beam group when the set of properties is accessed or applied).

Illustratively, the UE 404 may associate a set of properties with a beam group by fetching or accessing instructions (such as from memory of the UE 404) and executing the instructions using at least one processor (such as at least one processor internal to the UE 404, including at least one of a baseband processor, an application processor, or another chip implemented in the UE 404). In so doing, the UE 404 may at least one of generate, compute, calculate, select, link, or define at least one property and an association with a beam group in such a way that different sets of properties are discretely related to different beam groups. For example, a relationship between a respective set of properties and each of the beam groups may be mutually exclusive, in that each set of properties is related to one beam group and not related to other beam groups. Potentially, one or more properties may be shared or accessible across multiple beam groups, which may reduce some redundancy and inefficiency, although each set of properties associated with a respective beam group may be different from other sets of properties associated with other beam groups, such as by having at least one property that is different or absent from each of the other sets of properties.

A property associated with a beam group may include or may be derived from measurements, channel conditions, or other information using one or more beams within a beam group. In some aspects, the UE 404 may associate one or more properties with a beam group by deriving the one or more properties using information (such as measurements) gathered from one, multiple, or all beams within a beam group, such as with a function that accepts inputs related to the information gathered from the one or more beams of the beam group.

For example, a respective set of properties may include at least one of a CBR, CR, or threshold for the CR determined by the UE 404 using one, some, or all beams within a beam group. In some aspects, the beam group 410 may be associated with a set of properties including at least one of a transmission CBR associated with the UE 404 as the transmitter to the other apparatus 406 using beams of the beam group 410, a reception CBR associated with the UE 404 as the receiver from the other apparatus 406 using beams of the beam group 410, a transmission CR associated with the UE 404 as the transmitter to the other apparatus 406 using beams of the beam group 410, a reception CR associated with the UE 404 as the receiver from the other apparatus 406 using beams of the beam group 410, a transmission CR threshold associated with the UE 404 as the transmitter to the other apparatus 406 using beams of the beam group 410, or a reception CR threshold associated with the UE 404 as the receiver from the other apparatus 406 using beams of the beam group 410.

Each property of a respective set associated with one beam group may be applicable to each of the subset of active beams included in the one beam group. For example, the aforementioned at least one of the CBR, CR, or CR threshold may be applicable to all beams within the beam group 410. As each of the CBR, CR, and CR threshold is related to available resources being used (by other UEs and by the UE 404, respectively), the UE 404 may be able to determine a channel associated with one beam group having the most or having a satisfactory amount of unused resources, so that the UE 404 is able to select such a channel for communication, which may include at least one of transmission or reception via the one beam group. As a respective subsets of beams is directionally associated with one another in each of the beam groups, the UE 404 may effectively select a direction for communication that is least used or is less used than another direction (if more than one direction, or channel, is available).

In some aspects, the UE 404 may determine (such as by measuring, evaluating, tracking, recording, etc.) CR at a beam level, whereas the CR threshold may be determined at a beam-group level. The UE 404 may verify that a respective CR associated with a beam does not cause the CR threshold of a beam group to be satisfied each time a beam is to be added to the beam group (such as when the respective CR of the beam to be added is aggregated with the CRs of the beams in the beam group).

One or more properties of a beam group may be used to determine (such as by setting, calculating, selecting, associating, etc.) one or more other properties of the beam group. According to some aspects, the UE 404 may use a respective CBR associated with the beam group 410 to determine one or more properties for communication by the beam group 410. In some examples, the beams 412a and 412b of the beam group 410 may be configured as transmission beams, and the UE 404 may determine (such as by measuring, calculating, observing, etc.) a transmission CBR for the beam group 410. The UE 404 may determine one or more transmission properties associated with the beam group 410 based on the transmission CBR—such as when the UE 404 determines a transmission CR threshold based on the transmission CBR. In some other examples, the beams 412a and 412b of the beam group 410 may be configured as reception beams, and the UE 404 may determine (such as by measuring, calculating, observing, etc.) a reception CBR for the beam group 410. The UE 404 may determine one or more reception properties associated with the beam group 410 based on the reception CBR—such as when the UE 404 determines a reception CR threshold based on the reception CBR.

Additionally or alternatively, at least one of the CR or CR threshold may prevent the UE 404 from circumventing congestion control measures, such as congestion control conditions implemented at the UE 404 or access network. Specifically, the CR threshold may define the greatest amount (such as a percentage) of channel resources that the UE 404 is allowed to use (potentially, for a given time period). If the CR threshold were to be implemented at a beam level, the UE 404 may be able to circumvent CR-based congestion control measures by switching between the first beam 412a and the second beam 412b. However, the CR threshold may be implemented at a beam-group level, and therefore, when the first beam 412a and the second beam 412b are included in the same beam group 410, the UE 404 may reach the CR threshold for both the first beam 412a and the second beam 412b regardless of which beam the UE 404 uses for communication on the channel.

According to different aspects of congestion control, the UE 404 may use a respective CR associated with a beam group including transmission beams, including reception beams, or including both transmission and reception beams. For example, if the UE 404 is transmitting to the at least one other apparatus 406, the UE 404 may reduce (or "throttle") the amount of information transmitted based on a transmission CR measured for the beam group 410 used to transmit to the at least one other apparatus 406. In so doing, the UE 404 may effectively yield resources in order to reduce collisions and other interference, such as in the environment proximate to the at least one other apparatus 406.

By way of illustration, the UE 404 may determine (such as by measuring, observing, calculating, etc.) a transmission CR associated with the beam group 410, which may include the first beam 412a and the second beam 412b configured to be actively used as transmission beams. To determine the transmission CR, the UE 404 may calculate, at a slot n, the total number of sub-channels that the UE 404 is using to transmit information (which may be of a priority i) using at least one of the first beam 412a or the second beam 412b to the at least one other apparatus 406 in slots [n−a, n−1] and granted in slots [n, n+b] divided by the total number of configured sub-channels available in the transmission pool over slots [n−a, n+b].

In some other aspects, the beam group 410 may include reception beams, and therefore, the first beam 412a and the second beam 412b may be used by the UE 404 to receive information from the at least one other apparatus 406. Using at least one of the reception beams (such as the first beam 412a or the second beam 412b), the UE 404 may determine (such as by measuring, observing, calculating, etc.) a reception CR for the beam group 410. Specifically, the UE 404 may calculate, at a slot n, the total number of sub-channels that the UE 404 is using to receive information (which may be of a priority i) from the at least one other apparatus 406 in slots [n−a, n−1] and granted in slots [n, n+b] divided by the total number of configured sub-channels available in the transmission pool over slots [n−a, n+b].

The UE 404 may reduce the amount of information being transmitted (or potentially, cease transmitting) using beams 412a and 412b of the beam group 410 when the measured CR is approaching or satisfies (such as by being greater than or equal to) a CR threshold associated with the beam group 410. The UE 404 may reduce the amount of information being transmitted because the at least one other apparatus 406 may not successfully receive the transmitted information when the transmission rate by the UE 404 approaches or satisfies a transmission rate threshold, which may be based on a reception CBR associated with a beam group of the at least one other apparatus 406, such as when the transmission rate increases approximately in proportion to decreasing interference experienced by the at least one other apparatus 406.

With respect to resources used by other apparatuses, the UE 404 may consider a respective CBR associated with a beam group when selecting a number of HARQ retransmissions, selecting a number of sub-channels (such as $L_{subCH}$) to be used for transmission of data or control information on one or more sidelink channels (such as a PSSCH or PSCCH) in a slot, selecting a modulation-and-coding scheme (MCS) for communication, or setting a threshold (or limit) for a respective CR associated with the beam group.

In so doing, the UE 404 may use a respective CBR associated with a beam group including transmission beams, including reception beams, or including both transmission and reception beams. In one example, the UE 404 may determine a transmission CBR using transmission beams associated with a beam group and the UE 404 may determine a reception CBR using reception beams associated with the same or different beam group. The UE 404 may select one of the transmission CBR or the reception CBR (such as by selecting the larger of the two CBRs) for use in selecting at least one of the number of HARQ retransmissions, number of sub-channels to be used for transmission of data or control information on one or more sidelink channels in a slot, MCS, etc.

In another example, the UE 404 may measure a transmission CBR using transmission beams associated with a beam group, or the UE 404 may measure a reception CBR using reception beams associated with the same or different beam group. The UE 404 may use the transmission CBR to set a threshold for a transmission CR associated with the beam group, or the UE 404 may use the reception CBR to set a reception CR threshold associated with the one of the same or different beam group.

While the UE 404 is illustrated as having an example beam group 410 that includes two beams 412a and 412b, the UE 404 may have any number (including zero) of beam groups including any number of beams configured at any given time. In some aspects, the UE 404 may select one or more beam groups to include a single beam. In such instances in which a beam group includes a single beam, the UE 404 may associate a respective set of properties with that beam group using the single beam.

In some other aspects, the UE 404 may select at least two beam groups to include one beam. In other words, one beam of the set of active beams of the UE 404 may be simultaneously included in multiple beam groups. The UE 404 may associate sets of properties with beam groups on a beam-group level (as opposed to a beam level or other level of granularity), and therefore, a beam included in multiple beam groups may be differently used depending upon the sets of properties associated with the multiple beam groups in which the beam is included.

Referring to FIG. 5, a diagram illustrates example scenarios 500 and 520 in which a UE 504 selects a respective beam group of multiple beam groups 510a, 510b, 510c, and 510d to include each of a set of beams of the UE 504. As described herein, a UE may select at least one beam group to include each of a set of active beams of the UE such that a respective subset of active beams is directionally associated with one another in each of the beam groups.

In selecting at least one beam group to include each of a set of active beams, the UE may store information (such as with a data structure(s) in memory of the UE) indicating or defining each beam group. For example, information associated with one beam group may include a respective ID or other key differentiating the one beam group from other beam groups, as well as information associating each of the subset of active beams included in the one beam group. Further, the UE 504 may store information indicating a respective set of properties (such as at least one CBR, CR, or CR threshold) associated with each of the beam groups.

In the illustrated example scenarios 500 and 520, the UE 504 may determine (such as by estimating, evaluating, identifying, etc.) at least one beam group to include each of a set of beams that is actively used by the UE 504 at a given time. In order to determine the at least one beam group to include each of the set of beams that is actively used by the UE 504 at a given time, the UE 504 may determine (such as by evaluating, measuring, associating, etc.) which of the active beams is directionally associated with one or more other active beams (if any).

According to some aspects, the UE 504 may determine that active beams are directionally associated with other active beams according to an orientation of the UE 504. For example, the UE 504 may determine that active beams are directionally associated with other active beams according to an orientation of a respective antenna element (or respective antenna panel having the respective antenna element) used to generate each of the active beams. The UE 504 may determine an orientation of a respective antenna element using at least one coordinate system or frame. The at least one coordinate system may include an absolute, global, or geographic coordinate system, which may be available through a global positioning system (GPS) or global navigation satellite system (GNSS). With an absolute, global, or geographic coordinate system, a different beam index in a codebook of the UE 504 may result in the same or similar beam shape, such as when a configured set of beam groups remains valid when the UE 504 is rotated.

For example, referring to the first example scenario 500, the UE 504 may select at least one respective one of the beam groups 510a and 510b to include each of a set of beams of the UE 504 such that the UE 504 selects the first beam group 510a to include one or more beams associated with a northern direction, and the UE 504 selects the second beam group 510b to include one or more beams associated with a southern direction. The UE 504 may dynamically select at least one of the beam groups 510a and 510b to include each of the set of active beams at a first time t.

Similarly, referring to the second example scenario 520, the UE 504 may select at least one respective one of the beam groups 510c and 510d to include each of a set of beams of the UE 504 such that the UE 504 selects the third beam group 510c to include one or more beams associated with a western direction, and the UE 504 selects the fourth beam group 510d to include one or more beams associated with an eastern direction. The UE 504 may dynamically select at least one of the beam groups 510c and 510d to include each of the set of active beams at a second time t+n, which may be a time at which the set of beams actively used by the UE 504 is different than that at the first time t.

Additionally or alternatively, the at least one coordinate system may include a relative coordinate system. Thus, the UE 504 may determine orientations of antenna elements relative to the UE 504. For example, a point on the UE 504 may serve as the origin of the relative coordinate system, and the UE 504 may determine orientations of antenna elements relative to the origin. In some aspects, the relative coordinate system may be statically defined—for example, the UE 504 may have predefined or preconfigured sides or edges, such as a top, bottom, left side, and right side, according to which the UE 504 determines orientations of antenna elements. In some other aspects, the relative coordinate system may be adjusted, such as based on the orientation of the UE 504, mobility of the UE 504, the position(s) of other apparatuses with which the UE 504 is actively communicating, and the like.

For example, referring to the first example scenario 500, the UE 504 may select at least one respective one of the beam groups 510*a* and 510*b* to include each of a set of beams of the UE 504 such that the UE 504 selects the first beam group 510*a* to include one or more beams associated with a top side of the UE 504 or associated with at least one first apparatus 506*a*, and the UE 504 selects the second beam group 510*b* to include one or more beams associated with a bottom side of the UE 504 or associated with at least one second apparatus 506*b*. The UE 504 may dynamically select at least one of the beam groups 510*a* and 510*b* to include each of the set of active beams at a first time t.

Similarly, referring to the second example scenario 520, the UE 504 may select at least one respective one of the beam groups 510*c* and 510*d* to include each of a set of beams of the UE 504 such that the UE 504 selects the third beam group 510*c* to include one or more beams associated with a left side of the UE 504 or associated with at least one third apparatus 506*c*, and the UE 504 selects the fourth beam group 510*d* to include one or more beams associated with a right side of the UE 504 or associated with at least one fourth apparatus 506*d*. The UE 504 may dynamically select at least one of the beam groups 510*c* and 510*d* to include each of the set of active beams at a second time t+n, which may be a time at which the set of beams actively used by the UE 504 is different than that at the first time t.

In addition or alternative to the orientations of antenna elements, the UE 504 may determine that active beams are directionally associated with other active beams according to angles associated with active beams, such as an angle of arrival (AoA) with which signals are received using an active reception beam or angle of departure (AoD) with which signals are transmitted using an active transmission beam. In some further aspects, the UE 504 may determine that active beams are directionally associated with other active beams based on additional or alternative information, such as a respective TCI state associated with an active beam, a respective quasi-colocation (QCL) type associated with an active beam, or other information.

Now with reference to FIG. 6, a diagram illustrates example scenarios 600 and 620 in which a UE 604 selects at least one beam group to include each of a set of beams of the UE 604. The UE 604 may be configured to dynamically select at least one beam group to include each of a set of active beams based on the set of active beams. That is, as the set of active beams dynamically changes as beams are activated, and so added to the set of active beams, or deactivated, and so removed from the set of active beams, the UE 604 may be configured to dynamically adjust the grouping of active beams in accordance with the activation and deactivation of beams over time.

In the first example scenario 600, the UE 604 may have, at a first time $t_l$, a set of active beams that includes a first beam 612*a* and a second beam 612*b*. The UE 604 may use the first beam 612*a* to communicate with at least one first apparatus 606*a* (such as another UE, a base station, etc.), and may use the second beam 612*b* to communicate with at least one second apparatus 606*b*.

As the UE 604 may be communicating with two different apparatus 606*a* and 606*b* respectively using two different active beams 612*a* and 612*b*, the UE 604 may select a first beam group 610*a* to include the first beam 612*a* and may select a second beam group 610*b* to include the second beam 612*b*. At the first time $t_l$, the UE 604 may not consider the first beam 612*a* to be directionally associated with the second beam 612*b*. For example, the UE 604 may refrain from grouping the first beam 612*a* and the second beam 612*b* together in the same beam group because communicating using the first beam 612*a* may be unlikely to affect communication using the second beam 612*b* (and vice versa), congestion control may be unnecessary across the first beam 612*a* and the second beam 612*b*, properties or other channel conditions associated with the first beam 612*a* may be inapplicable to the second beam 612*b*, or for one or more other factors.

In the second example scenario 620, the UE 604 may have, at a second time $t_n$, a set of active beams that includes a first beam 612*a*, a second beam 612*b*, a third beam 612*c*, and a fourth beam 612*d*. The UE 604 may use the first beam 612*a* to communicate with at least one first apparatus 606*a* (such as another UE, a base station, etc.), the second beam 612*b* to communicate with at least one second apparatus 606*b*, the third beam 612*c* to communicate with at least one third apparatus 606*c*, and the fourth beam 612*d* to communicate with at least one fourth apparatus 606*d*.

As the UE 604 may be communicating with four different apparatus 606*a* and 606*b* respectively using four different active beams 612*a*, 612*b*, 612*c*, and 612*d*, the UE 604 may select a third beam group 610*c* to include the first beam 612*a* and the second beam 612*b* but may select a fourth beam group 610*d* to include the third beam 612*c* and the fourth beam 612*d*. Specifically, the UE 604 may select the third beam group 610*c* to include the first beam 612*a* and the second beam 612*b* because the UE 604 determines that the first beam 612*a* is directionally associated with the second beam 612*b*, and may select the fourth beam group 610*d* to include the third beam 612*c* and the fourth beam 612*d* because the UE 604 determines that the third beam 612*c* is directionally associated with the fourth beam 612*d*.

For example, the UE 604 may group the first beam 612*a* and the second beam 612*b* together in the same beam group 610*c* at the second time $t_n$, but not the first time $t_l$, because communicating using the first beam 612*a* may cause collisions or other interference to communication using the second beam 612*b* (and vice versa), such as where the UE 604 consumes a greater amount of resources when communicating with four other apparatuses 606*a*, 606*b*, 606*c*, and 606*d* than the UE 604 consumes when communicating with two other apparatuses 606*a* and 606*b*.

In some aspects, the first time $t_l$ may occur before the second time $t_n$, and therefore, the third beam 612*c* and the fourth beam 612*d* may be activated by the UE 604 (such as based on receiving respective RSs from the third apparatus 606*c* and the fourth apparatus 606*d*). When the UE 604 activates one or more additional beams, the UE 604 may select at least one beam group to include the one or more additional beams.

Potentially, the UE 604 may assign the one or more additional beams to at least one beam group based on at least one of the grouping of beams or set of active beams when the one or more additional beams are activated. If the one or more additional beams are directionally associated with any actively used beams, the UE 604 may add the one or more additional beams to at least one existing beam group that includes the directionally associated active beams. However, if the one or more additional beams are not directionally associated with any actively used beams, the UE 604 may create at least one new group to include the one or more additional beams that are directionally associated with one another.

In some other aspects, the first time $t_l$ may occur after the second time $t_n$, and therefore, the third beam 612c and the fourth beam 612d may be deactivated by the UE 604 (such as based on receiving information terminating communication with the third apparatus 606c or the fourth apparatus 606d, based on absence of communication with the third apparatus 606c or the fourth apparatus 606d, etc.). When the UE 604 deactivates one or more beams, the UE 604 may reconfigure grouping of beams. As illustrated in FIG. 6, the UE 604 may reconfigure grouping the first beam 612a together with the second beam 612b when at least one of the third beam 612c or fourth beam 612d is deactivated.

Figure 7:
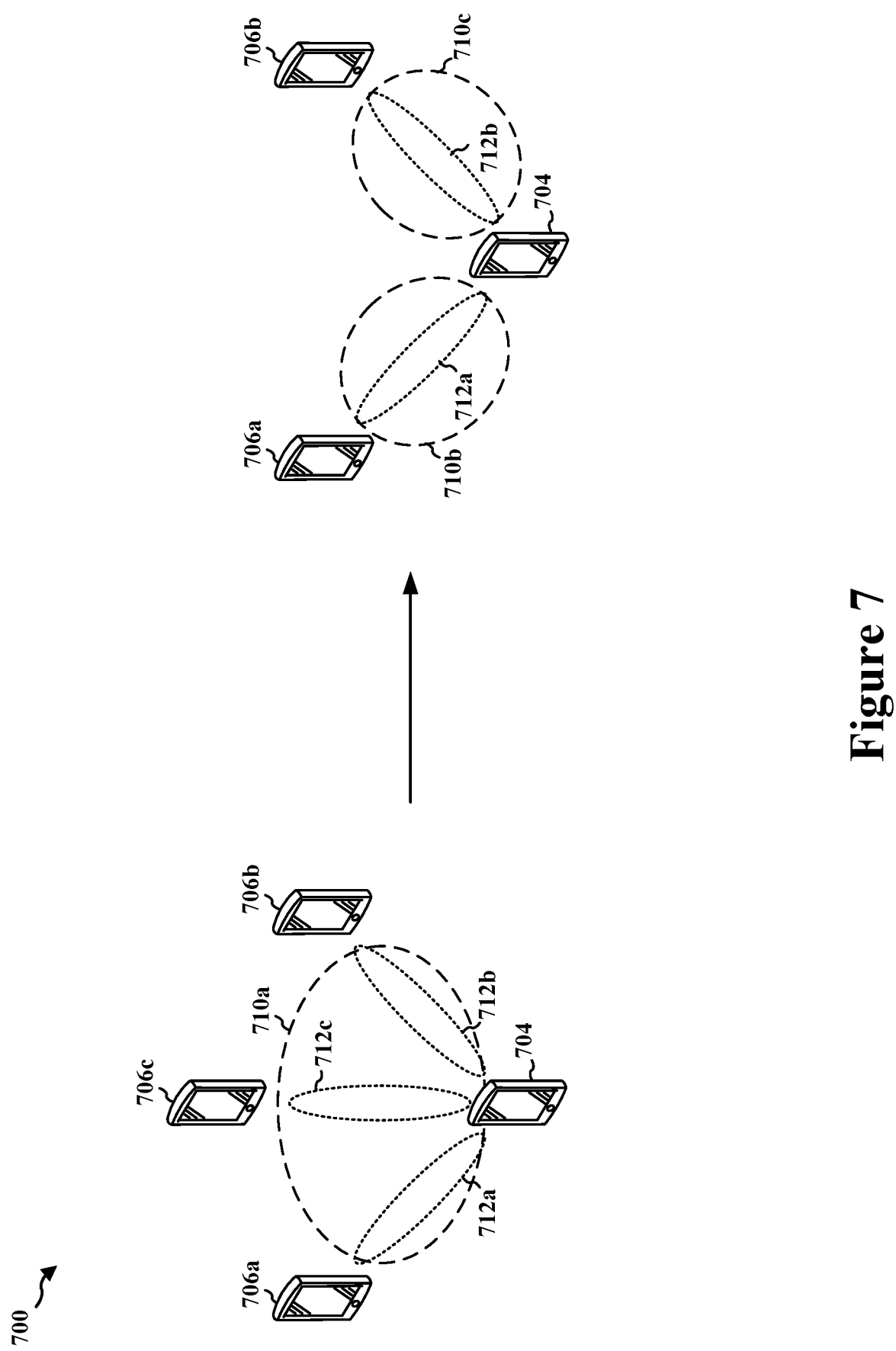
FIG. 7 is a diagram illustrating an example UE configured to dynamically split a beam group into at least two beam groups.

FIG. 7 is a diagram illustrating an example configuration 700 of a UE 704 that dynamically splits a beam group 710a into multiple beam groups 710b and 710c. In some aspects, the UE 704 may be configured to split one beam group into at least two beam groups when a beam is activated (such as when a threshold number of beams is satisfied for the one beam group).

According to the illustrated configuration 700, however, the UE 704 may split a first beam group 710a into multiple other beam groups 710b and 710c when a beam is deactivated. At a first time $t_l$, the UE 704 may have a set of active beams that includes a first beam 712a, a second beam 712b, and a third beam 712c. The UE 704 may use the first beam 712a to communicate with at least one first apparatus 706a (such as another UE, a base station, etc.), the second beam 712b to communicate with at least one second apparatus 706b, and the third beam 712c to communicate with at least one third apparatus 706c.

When the UE 704 is actively using the first beam 712a, the second beam 712b, and the third beam 712c, the UE 704 may group the active beams 712a, 712b, and 712c together in the first beam group 710a. The UE 704 may group the active beams 712a, 712b, and 712c together in the first beam group 710a leakage may occur between the active beams 712a, 712b, and 712c when the UE 704 is communicating. If the UE 704 is transmitting to each of the other apparatuses 706a, 706b, and 706c, for example, leakage may occur in the direction of the third beam 712c from the first beam 712a or the second beam 712b when the UE 704 transmits using the first beam 712a or the second beam 712b, respectively. Similarly, leakage may occur in the direction of the first beam 712a and the second beam 712b when the UE 704 transmits using the third beam 712c. Therefore, the UE 704 may determine the active beams 712a, 712b, and 712c are directionally associated with one another, and the UE 704 may group the active beams 712a, 712b, and 712c together in the first beam group 710a.

The UE 704, however, may cease transmitting to the third apparatus 706c, and therefore, the UE 704 may deactivate the third beam 712c. Thus, at a second time $t_n$, the UE 704 may have a set of active beams that includes the first beam 712a and the second beam 712b (and the third beam 712c may be inactive). When the UE 704 is actively using the first beam 712a and the second beam 712b, but not the third beam 712c, the UE 704 may group the first beam 712a in a second beam group 710b, and separately, may group the second beam 712b in a third beam group 710c. The UE 704 may group the first beam 712a separately from the second beam 712b because no (or a negligible) amount of leakage may occur between the first beam 712a and the second beam 712b when the UE 704 is communicating with (such as by transmitting to) the first apparatus 706a and the second apparatus 706b.

In some aspects, the UE 704 may determine (such as by associating, selecting, setting, etc.) a respective set of properties associated with each of the at least two beam groups into which another beam group is split based on another set of properties associated with the other beam group. For example, when the first beam group 710a is to be split into the second beam group 710b and the third beam group 710c, the UE 704 may determine a respective set of properties associated with each of the second beam group 710b and the third beam group 710c based on another set of properties associated with the first beam group 710a.

Illustratively, the UE 704 may determine at least one of a respective CBR or a respective CR associated with each of the second beam group 710b and the third beam group 710c based on at least one of a CBR associated with the first beam group 710a or a CR associated with the first beam group 710a. In some aspects, the UE 704 may initialize at least one of a respective CBR or a respective CR associated with each of the second beam group 710b and the third beam group 710c as a fraction of at least one of the CBR associated with the first beam group 710a or the CR associated with the first beam group 710a.

For example, the UE 704 may initialize at least one of a respective CBR or a respective CR associated with each of the second beam group 710b and the third beam group 710c as one-third the CBR associated with the first beam group 710a or the CR associated with the first beam group 710a because each of the second beam group 710b and the third beam group 710c includes one-third the number of beams as the first beam group 710a. In some other aspects, the UE 704 may initialize at least one of a respective CBR or a respective CR associated with each of the second beam group 710b and the third beam group 710c as equal to the CBR associated with the first beam group 710a or the CR associated with the first beam group 710a.

Figure 8:
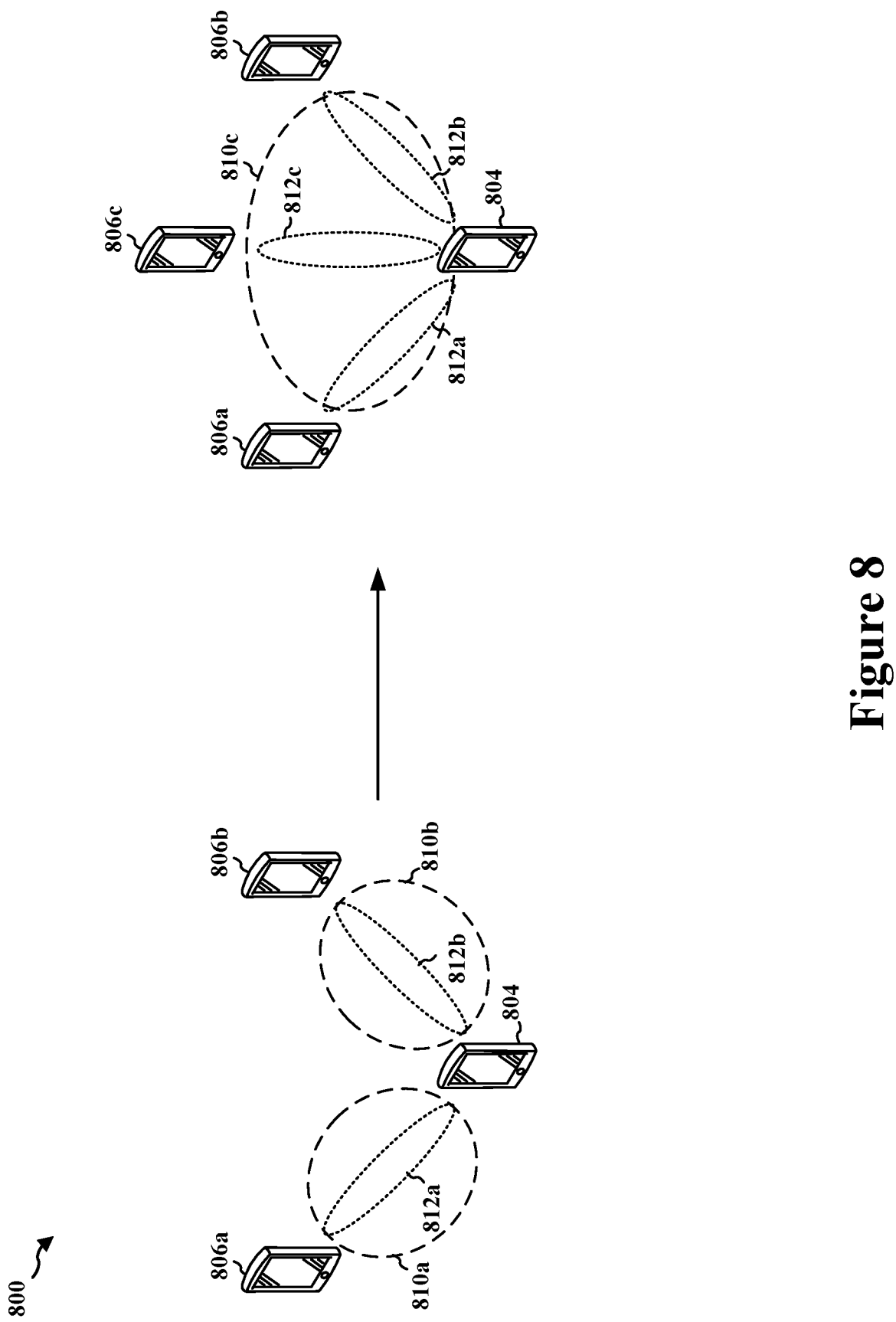
FIG. 8 is a diagram illustrating an example UE configured to dynamically merge at least two beam groups into one beam group.

FIG. 8 is a diagram illustrating an example UE 804 configured to dynamically merge at least two beam groups 810a and 810b into one beam group 810c. In some aspects, the UE 804 may be configured to merge two or more beam groups into one beam group when a beam is deactivated (such as when two beam groups that each has a relatively smaller number of beams is merged into one beam group when a beam is deactivated).

According to the illustrated configuration 800, however, the UE 804 may merge a first beam group 810a and a second beam group 810b into a third beam group 810c when a beam is activated. At a first time $t_l$, the UE 804 may have a set of active beams that includes a first beam 812a and a second beam 812b. The UE 804 may use the first beam 812a to communicate with at least one first apparatus 806a (such as another UE, a base station, etc.) and the second beam 812b to communicate with at least one second apparatus 806b.

When the UE 804 is actively using the first beam 812a and the second beam 812b (and the third beam 812c is inactive), the UE 804 may group the first beam 812a in a first beam group 810a, and separately, may group the second beam 812b in a second beam group 810b. The UE 804 may group the first beam 812a separately from the second beam 812b because no (or a negligible) amount of leakage may occur between the first beam 812a and the second beam

812b when the UE 804 is communicating with (such as by transmitting to) the first apparatus 806a and the second apparatus 806b.

At a second time $t_n$, however, the UE 804 may begin communicating with a third apparatus 806c, and therefore, the UE 804 may activate the third beam 812c. Therefore, the UE 804 may have a set of active beams that includes the first beam 812a, the second beam 812b, and the third beam 812c at the second time $t_n$. Based on activation of the third beam 812c, the UE 804 may group the active beams 812a, 812b, and 812c together in the third beam group 810c by merging the first beam group 810a and the second beam group 810b. The UE 804 may group the active beams 812a, 812b, and 812c together in the third beam group 810c because leakage may occur between the active beams 812a, 812b, and 812c when the UE 804 is communicating. If the UE 804 is transmitting to each of the other apparatuses 806a, 806b, and 806c, for example, leakage may occur in the direction of the third beam 812c from the first beam 812a or the second beam 812b when the UE 804 transmits using the first beam 812a or the second beam 812b, respectively. Similarly, leakage may occur in the direction of the first beam 812a and the second beam 812b when the UE 804 transmits using the third beam 812c. Therefore, the UE 804 may determine the active beams 812a, 812b, and 812c are directionally associated with one another, and the UE 804 may group the active beams 812a, 812b, and 812c together in the third beam group 810c.

In some aspects, the UE 804 may determine (such as by associating, selecting, setting, etc.) a set of properties associated with one beam group based on respective sets of properties associated with the at least two beam groups merged into the one beam group. For example, when the first beam group 810a and the second beam group 810b are to be merge into the third beam group 810c, the UE 804 may determine a set of properties associated with the third beam group 810c based on a respective set of properties associated with each of the first beam group 810a and the second beam group 810b.

Illustratively, the UE 804 may determine at least one of a CBR or a CR associated with the third beam group 810c based on at least one of a respective CBR or a respective CR associated with each of the first beam group 810a and the second beam group 810b. In some aspects, the UE 804 may initialize at least one of the CBR associated with the third beam group 810c or the CR associated with the third beam group 810c based on selecting one CBR or CR (such as the maximum CBR or maximum CR) from among the CBRs or CRs associated with each of the first beam group 810a and the second beam group 810b. For example, the UE 804 may initialize a transmission CBR associated with the third beam group 810c to 0.8 and a transmission CR associated with the third beam group 810c to 0.3 based on the first beam group 810a being associated with a transmission CBR of 0.6 and a transmission CR of 0.3 and the second beam group 810b being associated with a transmission CBR of 0.8 and a transmission CR of 0.2.

Figure 9:
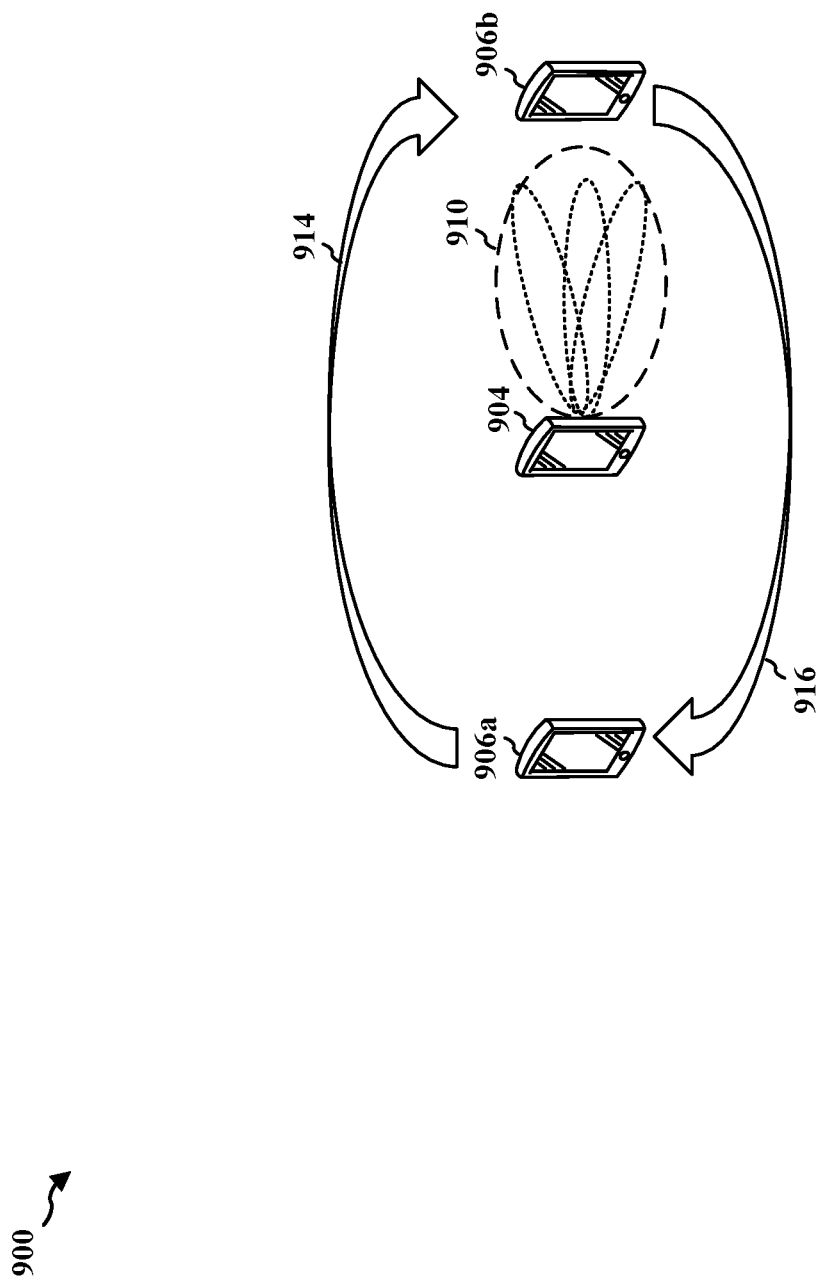
FIG. 9 is a diagram illustrating an example UE configured to associate a set of properties applicable with a beam group that includes one or more beams.

FIG. 9 is a diagram illustrating an example configuration 900 of a UE 904 that is to associate a set of properties with a beam group 910 having one or more beams, such as when the set of properties is applicable to each of the beams of the beam group 910. The UE 904 may be configured to transmit using beams of the beam group 910. The UE 904 may be in an environment in which the UE 904 is relatively between a first apparatus 906a that is transmitting information to a second apparatus 906b, with the second apparatus 906b transmitting reservations or feedback 916 (such as ACK/NACK messages) for the data 914 to the first apparatus 906a.

The UE 904 may be configured to determine (such as by selecting, associating, calculating, etc.) one or more properties associated with the beam group 910, which may include one or more properties based on a CBR associated with the beam group 910, such that collisions or other interference experienced at the apparatuses 906a and 906b is reduced. The UE 904 may determine (such as by measuring, calculating, evaluating, etc.) a transmission CBR associated with the beam group 910 based on signaling between the first apparatus 906a and the second apparatus 906b.

By way of illustration, the first apparatus 906a may transmit data 914 to the second apparatus 906b on a data channel, such as a PSSCH. Correspondingly, the second apparatus 906b may transmit reservations or feedback 916 for the data 914 to the first apparatus 906a on a data channel, such as a PSFCH. To determine the transmission CBR associated with the beam group 910 of the UE 904, the UE 904 may detect the reservations or feedback 916 for the data 914 on beams of the beam group 910 and, based thereon, may derive the amount or number of resources being consumed by data 914 transmitted by the first apparatus 906a. For example, the UE 904 may measure, in a slot n, the portion of sub-channels in which the data 914 is transmitted based on receiving information reserving resources or feedback 916 (such as ACK messages) for the data 914 on beams included in the beam group 910 over a measurement window [n−a, n−1].

The UE 904 may determine (such as by selecting, identifying, etc.) a transmission beam of the beam group 910 on which to transmit based on whether a channel is busy (such as with a relatively greater CBR that indicates a relatively greater probability of collision or interference) or idle (such as with a relatively lower CBR that indicates a relatively lower probability of collision or interference).

Figure 10:
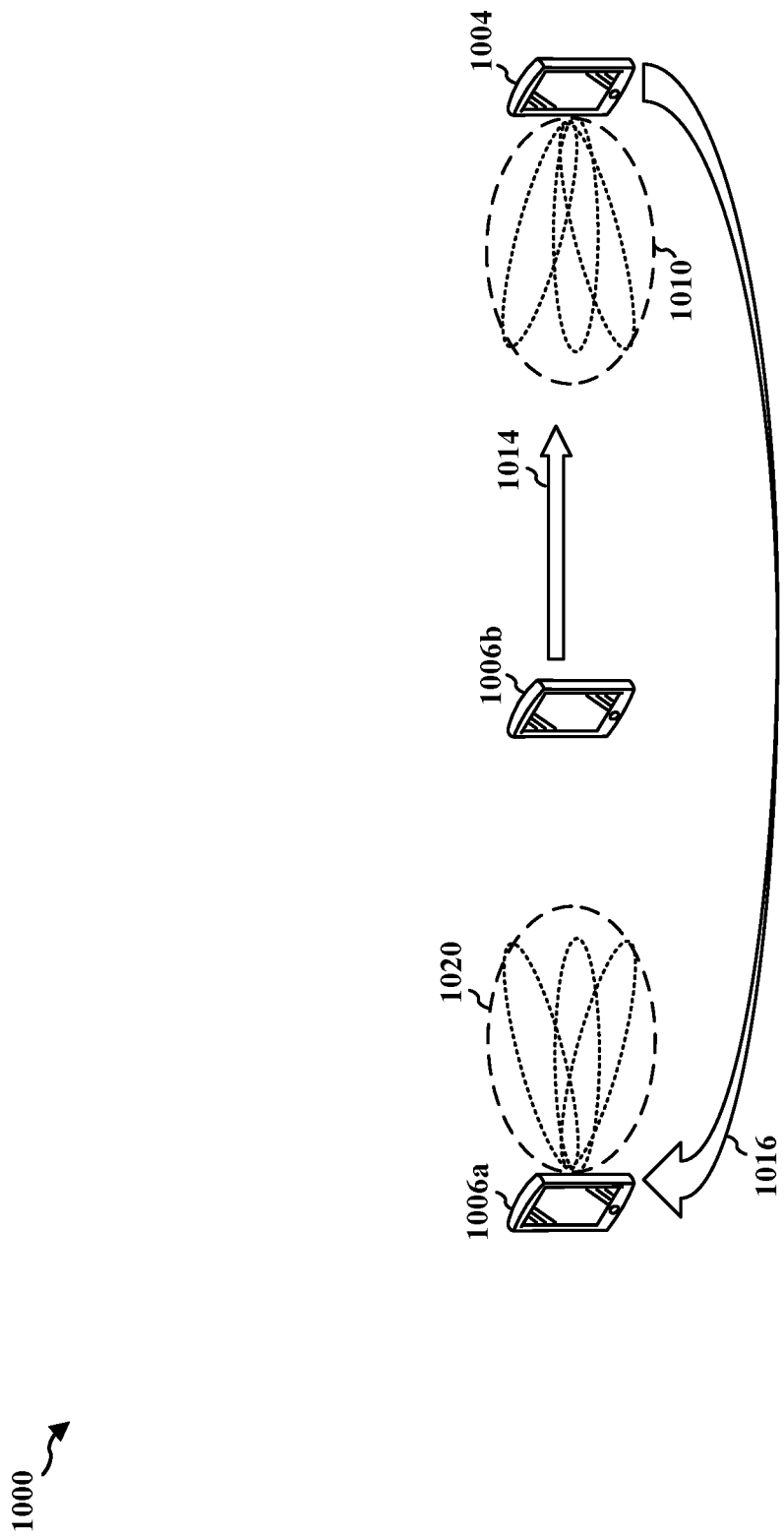
FIG. 10 is a diagram illustrating another example UE configured to associate another set of properties with another beam group that includes one or more other beams.

FIG. 10 is a diagram illustrating an example configuration 1000 of a UE 1004 that is to associate a set of properties with a beam group 1010 that includes one or more beams. The UE 1004 may be configured to receive information from a first apparatus 1006a using beams of a beam group 1010 of the UE 1004. The UE 1004 may be in an environment in which a second apparatus 1006b is relatively between the UE 1004 and the first apparatus 1006a.

The first apparatus 1006a may be configured to determine (such as by selecting, associating, calculating, etc.) one or more properties associated with a transmission beam group 1020, which may include one or more properties based on a reception CBR associated with the beam group 1010 of the UE 1004, such that collisions or interference experienced at the UE 1004 (or other apparatuses) are reduced. The UE 1004 may determine (such as by measuring, calculating, evaluating, etc.) a reception CBR associated with the beam group 1010 based on signaling by the second apparatus 1006b.

Illustratively, the second apparatus 1006b may transmit one or both of control information, such as sidelink control information (SCI), and data 1014 (such as on a PSSCH) in a direction of the UE 1004. Thus, the UE 1004 may detect the one or both of the SCI and data 1014 on the beams of the beam group 1010. For example, the UE 1004 may determine (such as by measuring, calculating, etc.) a reception CBR 1016 based on at least one received signal strength indicator (RSSI) associated with the one or both of SCI and data 1014 detected on one or more beams of the beam group 1010, which may include a beam the UE 1004 intends to use for reception from the first apparatus 1006a.

The UE 1004 may transmit information indicating the determined reception CBR 1016 to the first apparatus 1006a. The reception CBR 1016 may indicate whether a channel is busy (such as where a relatively greater CBR indicates a relatively greater probability of collision or other interference) or idle (such as where a relatively lower CBR indicates a relatively lower probability of collision or other interference) in the environment proximate to the UE 1004. Accordingly, the first apparatus 1006a may determine one or more parameters (such as an MCS, data rate, TB size, etc.) associated with transmission to the UE 1004 based on the received reception CBR 1016.

Figure 11:
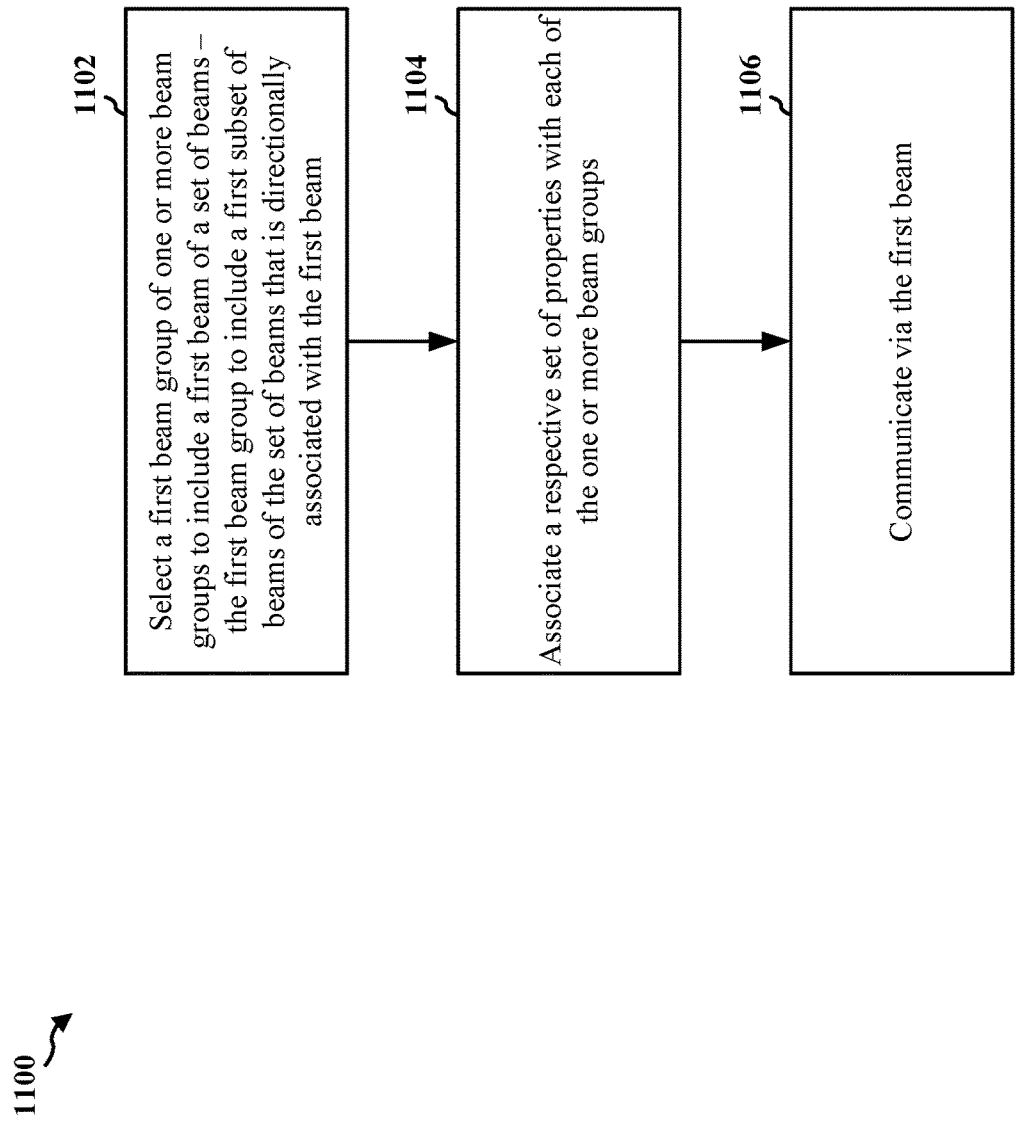
FIG. 11 is a flowchart of an example method of wireless communication by a UE.

FIG. 11 is a flowchart of an example method 1100 of wireless communication. The method 1100 may be performed by a UE (such as at least one of the UEs 104, 350, 404, 504, 604, 704, 804, 904, and 1004) or other apparatus (such as the apparatus 1302). According to various different aspects, one or more of the illustrated operations of the method 1100 may be transposed, omitted, or contemporaneously performed.

At 1102, the UE selects a first beam group of one or more beam groups to include a first beam of a set of beams, with the first beam group including a first subset of beams of the set of beams that is directionally associated with the first beam. For example, first, the UE may identify a set of beams that is being actively used by the UE, second, the UE may identify one or more subsets of beams that each includes one or more beams that are directionally associated with one another, and third, the UE may include a respective one of the one or more subsets in each of the one or more beam groups.

Referring to FIG. 4, the UE 404 may select the beam group 410 to include the first beam 412a and the second beam 412b. Referring to FIG. 5, the UE 504 may select at least one of beam groups 510a, 510b, 510c, and 510d to include each of the beams actively used by the UE 504 to communicate with the other apparatuses 506a, 506b, 506c, and 506d. Referring to FIG. 6, the UE 604 may select at least one of beam groups 610a, 610b, 610c, and 610d to include each of the beams 612a, 612b, 612c, and 612d actively used by the UE 604 to communicate with the other apparatuses 606a, 606b, 606c, and 606d. Referring to FIG. 7, the UE 704 may select at least one of beam groups 710a, 710b, and 710c to include each of the beams 712a, 712b, and 712c actively used by the UE 704 to communicate with the other apparatuses 706a, 706b, and 706c. Referring to FIG. 8, the UE 804 may select at least one of beam groups 810a, 810b, and 810c to include each of the beams 812a, 812b, and 812c actively used by the UE 804 to communicate with the other apparatuses 806a, 806b, and 806c. Referring to FIG. 9, the UE 904 may select the beam group 910 to include beams actively used by the UE 904 to transmit. Referring to FIG. 10, the UE 1004 may select the beam group 1010 to include beams actively used by the UE 1004 to receive from the first apparatus 1006a.

At 1104, the UE may associate a respective set of properties with each of the one or more beam groups. For example, first, the UE may collect measurements from the subset of beams included in the first group, and the UE may calculate at least one of a CBR, CR, or CR threshold applicable to the respective beam group using the collected measurements. In some aspects, the UE may associate a respective set of properties with the first (or another) beam group of the beam groups by computing one or more properties applicable to the beam group using set(s) of properties associated with one or more other beam groups, such as at least two second beam groups that are merged into the first beam group or a third beam group that is divided into the first beam group and one or more additional beam groups. For example, first, the UE may define the first beam group, such as by assigning one or more beams from one or more other beam groups to the first beam group, and second, the UE may compute the set of properties associated with the first beam group using set(s) of properties respectively associated with the one or more other beam groups.

Referring to FIG. 4, the UE 404 may associate a respective set of properties with the beam group 410 that includes the first beam 412a and the second beam 412b. Referring to FIG. 5, the UE 504 may associate a respective set of properties with each of the beam groups 510a, 510b, 510c, and 510d. Referring to FIG. 6, the UE 604 may associate a respective set of properties with each of the beam groups 610a, 610b, 610c, and 610d. Referring to FIG. 7, the UE 704 may associate a respective set of properties with each of the beam groups 710a, 710b, and 710c. Referring to FIG. 8, the UE 804 may associate a respective set of properties with each of the beam groups 810a, 810b, and 810c. Referring to FIG. 9, the UE 904 may associate a respective set of properties with the beam group 910. Referring to FIG. 10, the UE 1004 may associate a respective set of properties with the beam group 1010.

At 1106, the UE may communicate via the first beam of the first beam group. In some aspects, the UE may transmit information to at least one other apparatus via the first beam. In some other aspects, the UE may receive information from at least one other apparatus via the first beam.

Referring to FIG. 4, the UE 404 may communicate with the other apparatus 406 via at least one of the first beam 412a or the second beam 412b of the beam group 410. Referring to FIG. 5, the UE 504 may communicate with each of the other apparatuses 506a, 506b, 506c, and 506d via at least one beam of at least one of the beam groups 510a, 510b, 510c, and 510d. Referring to FIG. 6, the UE 604 may communicate with each of the other apparatuses 606a, 606b, 606c, and 606d via at least one of the active beams 612a, 612b, 612c, and 612d respectively included in at least one of the beam groups 610a, 610b, 610c, and 610d. Referring to FIG. 7, the UE 704 may communicate with each of the other apparatuses 706a, 706b, and 706c via at least one of the active beams respectively included in at least one of the beam groups 710a, 710b, and 710c. Referring to FIG. 8, the UE 804 may communicate with each of the other apparatuses 806a, 806b, and 806c via at least one of the active beams respectively included in at least one of the beam groups 810a, 810b, and 810c. Referring to FIG. 9, the UE 904 may communicate with via at least one of the active beams included in the beam group 910. Referring to FIG. 10, the UE 1004 may communicate with the first apparatus 1006a via at least one of the active beams respectively included in the beam group 1010.

Figure 12:
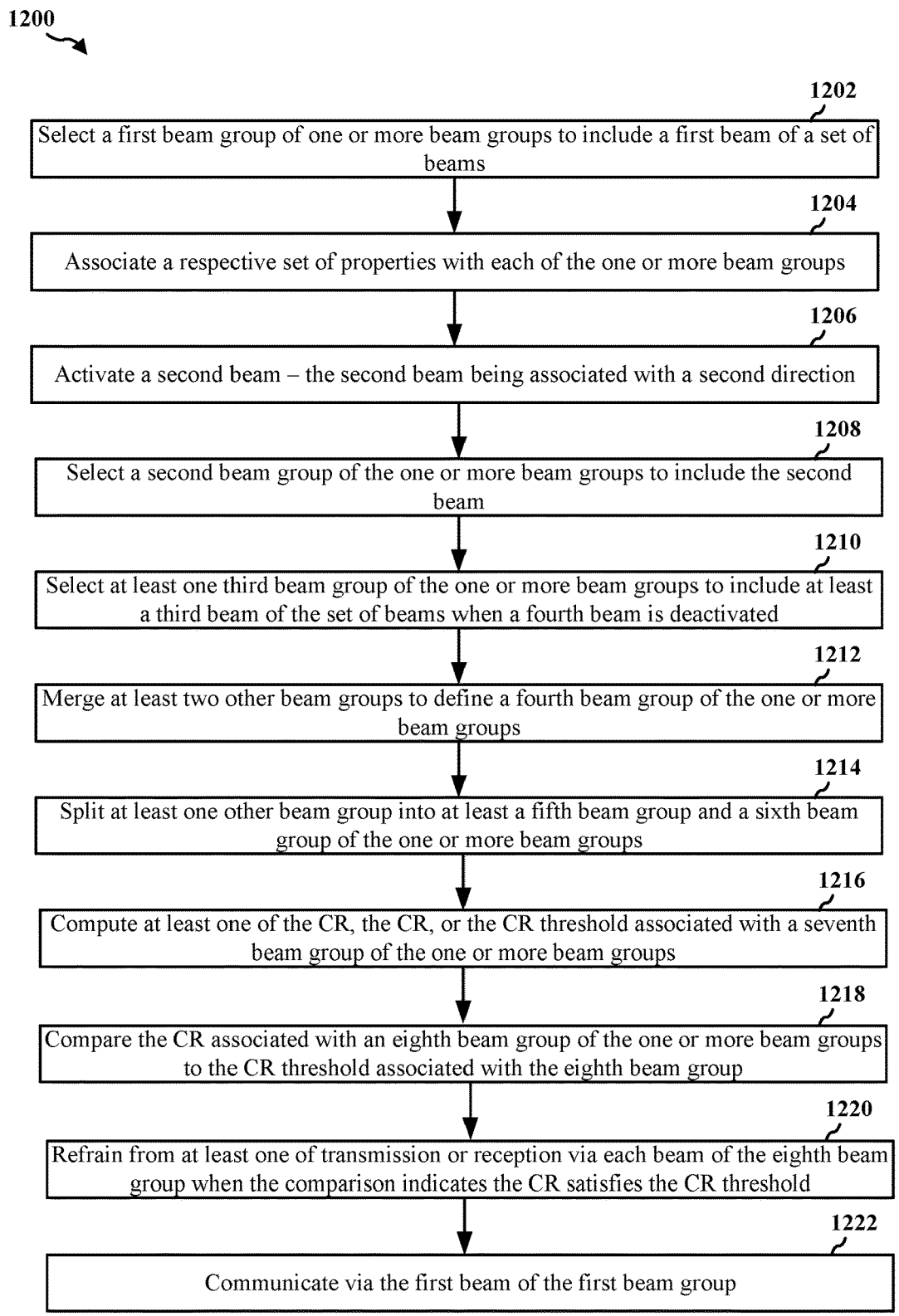
FIG. 12 is a flowchart of another example method of wireless communication by a UE.

FIG. 12 is a flowchart of another example method 1200 of wireless communication. The method 1200 may be performed by a UE (such as the UE 104, 350, 404, 504, 604, 704, 804, 904, and 1004) or other apparatus (such as the apparatus 1302). According to various different aspects, one or more of the illustrated operations of the method 1200 may be transposed, omitted, or contemporaneously performed.

At 1202, the UE selects a first beam group of one or more beam groups to include each of a set of beams, with the first beam group including a first subset of beams of the set of beams that is directionally associated with the first beam. For example, first, the UE may evaluate active (or ongoing)

communication with another apparatus, which may be indicative of a set of beams actively used by the UE. By way of illustration and not limitation, active communication may include receiving signals from or transmitting signals to, such as reference signals, another apparatus, and applying one or more parameters corresponding to the signals for receiving information from or transmitting information to the other apparatus. The UE may calculate a respective direction corresponding to each of the a set of beams that is being actively used by the UE, second, the UE may identify one or more subsets of beams that each includes one or more beams that are respectively directionally associated with one another, and third, the UE may include a respective one of the one or more subsets in each of one or more beam groups. According to some aspects, each of the set of beams is actively used by the UE. According to some other aspects, each of the set of beams is used for at least one of transmission or reception with at least one other apparatus. According to some further aspects, each beam of the respective subset of beams of the set of beams is directionally associated with each other beam of the respective subset of beams in one of a global coordinate system or a relative coordinate system associated with the UE.

According to still other aspects, at least one of the set of beams is assigned to at least two of the beam groups.

Referring to FIG. 4, the UE 404 may select the beam group 410 to include the first beam 412a and the second beam 412b. Referring to FIG. 5, the UE 504 may select at least one of beam groups 510a, 510b, 510c, and 510d to include each of the beams actively used by the UE 504 to communicate with the other apparatuses 506a, 506b, 506c, and 506d. Referring to FIG. 6, the UE 604 may select at least one of beam groups 610a, 610b, 610c, and 610d to include each of the beams 612a, 612b, 612c, and 612d actively used by the UE 604 to communicate with the other apparatuses 606a, 606b, 606c, and 606d. Referring to FIG. 7, the UE 704 may select at least one of beam groups 710a, 710b, and 710c to include each of the beams 712a, 712b, and 712c actively used by the UE 704 to communicate with the other apparatuses 706a, 706b, and 706c. Referring to FIG. 8, the UE 804 may select at least one of beam groups 810a, 810b, and 810c to include each of the beams 812a, 812b, and 812c actively used by the UE 804 to communicate with the other apparatuses 806a, 806b, and 806c. Referring to FIG. 9, the UE 904 may select the beam group 910 to include beams actively used by the UE 904 to transmit. Referring to FIG. 10, the UE 1004 may select the beam group 1010 to include beams actively used by the UE 1004 to receive from the first apparatus 1006a.

At 1204, the UE may associate a respective set of properties with each of the one or more beam groups. For example, first, the UE may associate one or more properties with a respective one of the one or more beam groups by computing or calculating at least one of a CBR, CR, or CR threshold using one or more beams of a respective beam group, and second, the UE may determine at least one of a CBR, CR, or CR threshold applicable to the respective beam group using the CBR, CR, or CR threshold computed using one or more beams of the respective beam group. In some aspects, the CBR may be associated with feedback information or other information (such as other information received on a PSFCH). In some other aspects, the CBR is associated with SCI or other data received on a PSCCH or PSSCH.

Referring to FIG. 4, the UE 404 may associate a respective set of properties with the beam group 410 that includes the first beam 412a and the second beam 412b. Referring to FIG. 5, the UE 504 may associate a respective set of properties with each of the beam groups 510a, 510b, 510c, and 510d. Referring to FIG. 6, the UE 604 may associate a respective set of properties with each of the beam groups 610a, 610b, 610c, and 610d. Referring to FIG. 7, the UE 704 may associate a respective set of properties with each of the beam groups 710a, 710b, and 710c. Referring to FIG. 8, the UE 804 may associate a respective set of properties with each of the beam groups 810a, 810b, and 810c. Referring to FIG. 9, the UE 904 may associate a respective set of properties with the beam group 910. Referring to FIG. 10, the UE 1004 may associate a respective set of properties with the beam group 1010.

At 1206, the UE may activate a second beam, and the second beam may be associated with a second direction. For example, first, the UE may determine a set of parameters associated with communicating (such as by transmitting or receiving) at least one RS with another apparatus, and second, the UE may apply the set of parameters for communication of data or control information with the other apparatus. In some aspects, the UE may update the set of active beams to include the second beam.

Referring to FIG. 6, the UE 604 may activate the third beam 612c and the fourth beam 612d—each of which may be associated with a respective direction that is different from that of the first beam 612a and the second beam 612b. Referring to FIG. 8, the UE 804 may activate the third beam 812c, which may be associated with a direction that is different from that of the first beam 812a and the second beam 812b.

At 1208, the UE may select a second beam group of the one or more beam groups to include the second beam, such as by identifying that a second subset of beams of the second beam group is directionally associated with the second direction of the second beam. For example, the UE may determine that the second beam has a second direction that is directionally associated with one or more beams of a second subset of beams of the set of beams, and the UE may assign the second beam to the second beam group that includes the second subset of beams directionally associated with the second direction of the second beam. In another example, the UE may determine that the second beam has a second direction that is not directionally associated with any of the set of beams assigned to the one or more beam groups, and in response, the UE may generate or define another beam group that the UE may select to include the second beam, such as when the UE generates a new beam group that is added to the one or more beam groups. Thus, the second beam may be a single beam in the second beam group, for example, until one or more of the set of beams is activated or deactivated such that the UE is configured to reconfigure or reassign at least a portion of the set of beams to at least one beam group of the one or more beam groups. In some aspects, the second beam group may be selected or defined based on at least one other beam group, such as another beam group that was previously included in one or more beam groups at an earlier time but is absent from or undefined in the current one or more beam groups due to the at least one other beam group having been merged with at least one additional beam group or having been split or divided into two or more beam groups included in the beam groups currently defined or used by the UE.

Referring to FIG. 6, the UE 604 may select the fourth beam group 610d to include the third beam 612c and the fourth beam 612d, which may be directionally associated with one another. Referring to FIG. 8, the UE 804 may select the third beam group 810c to include the first beam 812a, the second beam 812b, and the third beam 812c, which may be directionally associated with one another.

At 1210, the UE may select at least one third beam group of the one or more beam groups to include at least a third beam of the set of beams that is active when a fourth beam is deactivated. The UE may remove the fourth beam from the set of beams considered to be active when the fourth beam is deactivated or otherwise inactive, and therefore, the fourth beam may be removed from each of the one or more beam groups that may have been selected to include the fourth beam when the fourth beam was considered active and in the set of beams. By way of illustration and not limitation, the UE may classify the fourth beam as deactivated when communication on a channel including the fourth beam has been terminated, such as when the UE sends or receives a message to the other apparatus that indicates communication between the UE and the other apparatus has concluded or when the UE experiences or detects a radio link failure on the channel including the fourth beam. For example, first, the UE may identify a set of beams that is being actively used by the UE from which the fourth beam may be removed. The UE may identify one or more subsets of beams that each includes one or more beams that are directionally associated with one another, such as in response to the fourth beam being deactivated, which may cause the UE to reevaluate distribution of the set of beams across the one or more beam groups. Third, the UE may reconfigure the distribution of beams over the one or more beam groups, such as by generating or adjusting at least one criterion upon which selection of one or more of the beam groups. The fourth beam may be absent from the one or more beam groups when the fourth beam is deactivated by the UE or when the UE otherwise classifies the fourth beam as being inactive, such as when the UE reduces or ceases supplying power to one or more components of the UE used to generate the fourth beam or when the UE ceases applying one or more parameters (such as a spatial filter, TCI state, and the like) associated with defining the third direction for beamformed communication with another apparatus.

Referring to FIG. 6, the UE 604 may select the first beam group 610a to include the first beam 612a and the second beam group 610b to include the second beam 612b, which may not be directionally associated with one another, when the third beam 612c and the fourth beam 612d are deactivated. Referring to FIG. 7, the UE 704 may select the second beam group 810b to include the first beam 712a and select the third beam group 810c to include the second beam 812b when the third beam 712c is deactivated.

At 1212, the UE may merge at least two other beam groups to define a fourth beam group of the one or more beam groups, with the fourth beam group including at least one beam from each of the at least two other beam groups. For example, first, the UE may determine that one subset of beams that one beam group of the at least two other beam groups was selected to include is directionally associated with another subset of beams that another beam group of the at least two other beam groups was selected to include, such as when the UE reconfigures at least one criterion upon which the directional association between beams is predicated or when the UE changes the set of active beams by adding an activated beam thereto or removing a deactivated beam therefrom. Second, the UE may select the fourth beam group of the one or more beam groups to include at least a portion of a respective subset of beams of each of the at least two other groups, such as by comparing directions respectively associated with active beams and evaluating which beams are directionally associated with which other beams according to at least one criterion that at least partially defines directional association between beams of a set of beams that is active at the UE at a given time. In other words, the UE may dynamically define directional association of beams according to the beams that are active and the beam groups selected to include subsets of beams of the set of active beams, which may facilitate the multiple selections by the UE of beam groups to include subsets of beams in a manner that is suitable for different sets of beams that are active at different times.

Referring to FIG. 8, the UE 804 may merge the first beam 812a of the first beam group 810a and the second beam 812b of the second beam group 810b into the third beam group 810c, which may include beams that are directionally associated with the third beam 812c.

At 1214, the UE may split at least one other beam group into at least a fifth beam group and a sixth beam group of the one or more beam groups. For example, first, the UE may determine that beams of the at least one other beam group are no longer directionally associated with one another, such as when the UE reconfigures at least one criterion according to which the UE evaluates directional associations between beams over the set of active beams or when the directional association between beams of at least a portion of the set of beams is affected by addition of an activated beam to the set of active beams or removal of a deactivated beam from the set of active beams. Second, the UE may select the fifth beam group to include one or more beams of the at least one other beam group that are determined to be directionally associated with one another, and further, the UE may select the sixth beam group to include one or more beams of the at least one other beam group that are determined to be directionally associated with one another. The fifth beam group may include at least one beam that is not included in the sixth beam group—for example, one or more beams included in the fifth beam group may be directionally unassociated with one or more beams included in the sixth beam group according to a directional association between beams that may be redefined by the UE at to accommodate communication via a set of beams that is active at a given time.

Referring to FIG. 7, the UE 704 may split the first beam group 710a, which included the first beam 712a, the second beam 712b, and the third beam 712c, into the second beam group 710b including the first beam 712a and the third beam group 710c including the second beam 712b.

At 1216, the UE may compute at least one of a CBR, a CR, or a CR threshold associated with a seventh beam group of the one or more beam groups. Referring to the CBR, for example, the UE may compute a transmission CBR, at a slot n, as the portion of sub-channels on which the UE may transmit that the UE determines is occupied or busy over a measurement window [n−a, n−1]. Similarly, the UE may compute a reception CBR, at a slot n, as the portion of sub-channels on which the UE may receive that the UE determines is occupied or busy over a measurement window [n−a, n−1]. Referring to the CR, the UE may compute a transmission CR, at a slot n, as the total number of sub-channels that the UE is using to transmit information (which may be of a priority i) to at least one other apparatus in slots [n−a, n−1] and granted in slots [n, n+b] divided by the total number of configured sub-channels available in the transmission pool over slots [n−a, n+b]. Similarly, the UE may compute a reception CR, at a slot n, as the total number of sub-channels that the UE is using to receive information (which may be of a priority i) from at least one other apparatus in slots [n−a, n−1] and granted in slots [n, n+b]

divided by the total number of configured sub-channels available in the transmission pool over slots [n−a, n+b].

In some aspects, the UE may compute at least one of the CBR, CR, or CR threshold associated with the seventh beam group of the one or more beam groups using the at least one other CBR, at least one other CR, or at least one other CR threshold associated with the seventh beam group. For example, the UE may compute at least one of the CBR, CR, or CR threshold associated with the seventh beam group using at least another of the CBR, the CR, or the CR threshold associated with the seventh beam group, such as when the UE computes at least one CR associated with the seventh beam group using at least one CBR associated with the seventh beam group.

In some other aspects, the UE may compute at least one of the CBR, CR, or CR threshold associated with the seventh beam group of the one or more beam groups using at least one other CBR, at least one other CR, or at least one other CR threshold associated with at least one other beam group (such as at least one other beam group that was previously selected to include one or more beams but is no longer included or represented in the one or more beam groups). Illustratively, the at least one other beam group may have been defined and used in the past, but may be absent from the one or more beam groups currently defined and used by the UE as a result of the UE dividing the at least one other beam group into two or more of the (currently defined) beam groups or merging the at least one other beam group with at least one additional previously defined beam group to create or define the seventh beam group included in the one or more beam groups. For example, the UE may compute at least one of the CBR, CR, or CR threshold associated with the seventh beam group as using a fraction of at least one other CBR, at least one other CR, or at least one other CR threshold associated with at least one other beam group. In another example, the UE may compute at least one of the CBR, CR, or CR threshold associated with the seventh beam group of the one or more beam groups using at least one comparison between at least two other CBRs, at least two other CRs, or at least two other CR thresholds respectively associated with at least two other beam groups. For example, the UE may compare at least two other CBRs, at least other CRs, or at least two other CR thresholds to determine which of the at least two other CBRs, at least two other CRs, or at least two other CR thresholds is greatest (or alternatively, lowest). Thus, the UE may compute the at least one of the CBR, CR, or CR threshold associated with the seventh beam group by evaluating comparison between the at least two other CBRs, at least two other CRs, or at least two other CR thresholds respectively associated with at least two other beam groups in order to derive a respective maximum (or minimum) between the at least two other CBRs, at least two other CRs, or at least two other CR thresholds respectively associated with at least two other beam groups. The UE may assign the respective maximum (or minimum) between the at least two other CBRs, at least two other CRs, or at least two other CR thresholds to the seventh beam group.

Referring to FIG. 4, the UE 404 may compute at least one of a CBR, CR, or CR threshold associated with the beam group 410 that includes the first beam 412*a* and the second beam 412*b*. Referring to FIG. 5, the UE 504 may compute at least one of a CBR, CR, or CR threshold associated with each of the beam groups 510*a*, 510*b*, 510*c*, and 510*d*. Referring to FIG. 6, the UE 604 may compute at least one of a CBR, CR, or CR threshold associated with each of the beam groups 610*a*, 610*b*, 610*c*, and 610*d*. Referring to FIG. 7, the UE 704 may compute at least one of a CBR, CR, or CR threshold associated with each of the beam groups 710*a*, 710*b*, and 710*c*. Referring to FIG. 8, the UE 804 may compute at least one of a CBR, CR, or CR threshold associated with each of the beam groups 810*a*, 810*b*, and 810*c*. Referring to FIG. 9, the UE 904 may compute at least one of a CBR, CR, or CR threshold associated with the beam group 910. Referring to FIG. 10, the UE 1004 may compute at least one of a CBR, CR, or CR threshold associated with the beam group 1010.

At 1218, the UE may compare the CR associated with an eighth beam group of the one or more beam groups to a CR threshold associated with the eighth beam group. For example, the UE may determine at least one CR associated with the eighth beam group, such as by measuring traffic communicated with the UE via one or more beams of the eighth beam group over a set of slots and calculating the ratio of the measured traffic to the amount or number of resources available to carry traffic over the set of slots. The UE may compare the at least one CR with at least one CR threshold associated with the eighth beam group, and based thereon, the UE may determine whether the at least one CR satisfies the at least one CR threshold. For example, the UE may determine that the at least one CR satisfies the at least one CR threshold when the at least one CR is equal to or greater than the at least one CR threshold.

Referring to FIG. 4, the UE 404 may compare a CR associated with the beam group 410 that includes the first beam 412*a* and the second beam 412*b* to a CR threshold associated with the beam group 410. Referring to FIG. 5, the UE 504 may compare a respective CR associated with each of the beam groups 510*a*, 510*b*, 510*c*, and 510*d* to a respective CR threshold associated with each of the beam groups 510*a*, 510*b*, 510*c*, and 510*d*. Referring to FIG. 6, the UE 604 may compare a respective CR associated with each of the beam groups 610*a*, 610*b*, 610*c*, and 610*d* to a respective CR threshold associated with each of the beam groups 610*a*, 610*b*, 610*c*, and 610*d*. Referring to FIG. 7, the UE 704 may compare a respective CR associated with each of the beam groups 710*a*, 710*b*, and 710*c* to a respective CR threshold associated with each of the beam groups 710*a*, 710*b*, and 710*c*. Referring to FIG. 8, the UE 804 may compare a respective CR associated with each of the beam groups 810*a*, 810*b*, and 810*c* to a respective CR threshold associated with each of the beam groups 810*a*, 810*b*, and 810*c*. Referring to FIG. 9, the UE 904 may compare a CR associated with the beam group 910 to a CR threshold associated with the beam group 910. Referring to FIG. 10, the UE 1004 may compare a CR associated with the beam group 1010 to a CR threshold associated with the beam group 1010.

At 1220, the UE may refrain from at least one of transmission or reception via each beam of the eighth beam group of the one or more beam groups when the comparison indicates that the CR associated with the eighth beam group satisfies the CR threshold associated with the eighth beam group. For example, first, the UE may start a back-off timer when detecting that the CR associated with the eighth beam group satisfies the CR threshold associated with the eighth beam group. Second, the UE may halt at least one of transmission or reception via each beam of the eighth beam group while the back-off timer is running, such as by ceasing transmission of at least one of data or control information or declining to decode at least one of data or control information carried on resources that overlap in the time domain with the unexpired duration of the back-off timer. Third, the UE may detect expiration of the back-off timer. In some aspects, the UE may resume the at least one of transmission or reception via one or more beams of the eighth beam group after reevaluating the CR associated with the eighth beam group in comparison to the CR threshold associated with the eighth beam group. Thus, the UE may resume the at least one of transmission or reception via one or more beams of the eighth beam group when the UE determines that the CR associated with the eighth beam group no longer satisfies the CR threshold associated with the eighth beam group, such as when the CR associated with the eighth beam group is less than the CR threshold associated with the eighth beam group.

Referring to FIG. 4, the UE 404 may refrain from at least one of transmission or reception via each of the first beam 412a and the second beam 412b of the beam group 410 when the comparison indicates that the CR associated with the beam group 410 satisfies the CR threshold associated with the beam group 410. Referring to FIG. 5, the UE 504 may refrain from at least one of transmission or reception via each of the beams of at least one of the beam groups 510a, 510b, 510c, and 510d when the comparison indicates that the CR associated with the at least one of the beam groups 510a, 510b, 510c, and 510d satisfies the CR threshold associated with the at least one of the beam groups 510a, 510b, 510c, and 510d. Referring to FIG. 6, the UE 604 may refrain from at least one of transmission or reception via each of the beams of at least one of the beam groups 610a, 610b, 610c, and 610d when the comparison indicates that the CR associated with the at least one of the beam groups 610a, 610b, 610c, and 610d satisfies the CR threshold associated with the at least one of the beam groups 610a, 610b, 610c, and 610d. Referring to FIG. 7, the UE 704 may refrain from at least one of transmission or reception via each of the beams of at least one of the beam groups 710a, 710b, and 710c when the comparison indicates that the CR associated with the at least one of the beam groups 710a, 710b, and 710c satisfies the CR threshold associated with the at least one of the beam groups 710a, 710b, and 710c. Referring to FIG. 8, the UE 804 may refrain from at least one of transmission or reception via each of the beams of at least one of the beam groups 810a, 810b, and 810c when the comparison indicates that the CR associated with the at least one of the beam groups 810a, 810b, and 810c satisfies the CR threshold associated with the at least one of the beam groups 810a, 810b, and 810c. Referring to FIG. 9, the UE 904 may refrain from at least one of transmission or reception via each of the beams of the beam group 910 when the comparison indicates that the CR associated with the beam group 910 satisfies the CR threshold associated with the beam group 910. Referring to FIG. 10, the UE 1004 may refrain from at least one of transmission or reception via each of the beams of the beam group 1010 when the comparison indicates that the CR associated with the beam group 1010 satisfies the CR threshold associated with the beam group 1010.

At 1222, the UE may communicate via the first beam of the first beam group. In some aspects, the UE may transmit information to at least one other apparatus via the first beam of the first beam group of the one or more beam groups. In some other aspects, the UE may receive information from at least one other apparatus via the first beam of the first beam group of the one or more beam groups.

Referring to FIG. 4, the UE 404 may communicate with the other apparatus 406 via at least one of the first beam 412a or the second beam 412b of the beam group 410. Referring to FIG. 5, the UE 504 may communicate with each of the other apparatuses 506a, 506b, 506c, and 506d via at least one beam of at least one of the beam groups 510a, 510b, 510c, and 510d. Referring to FIG. 6, the UE 604 may communicate with each of the other apparatuses 606a, 606b, 606c, and 606d via at least one of the active beams 612a, 612b, 612c, and 612d respectively included in at least one of the beam groups 610a, 610b, 610c, and 610d. Referring to FIG. 7, the UE 704 may communicate with each of the other apparatuses 706a, 706b, and 706c via at least one of the active beams respectively included in at least one of the beam groups 710a, 710b, and 710c. Referring to FIG. 8, the UE 804 may communicate with each of the other apparatuses 806a, 806b, and 806c via at least one of the active beams respectively included in at least one of the beam groups 810a, 810b, and 810c. Referring to FIG. 9, the UE 904 may communicate via at least one of the active beams included in the beam group 910. Referring to FIG. 10, the UE 1004 may communicate with the first apparatus 1006a via at least one of the active beams respectively included in the beam group 1010.

Figure 13:
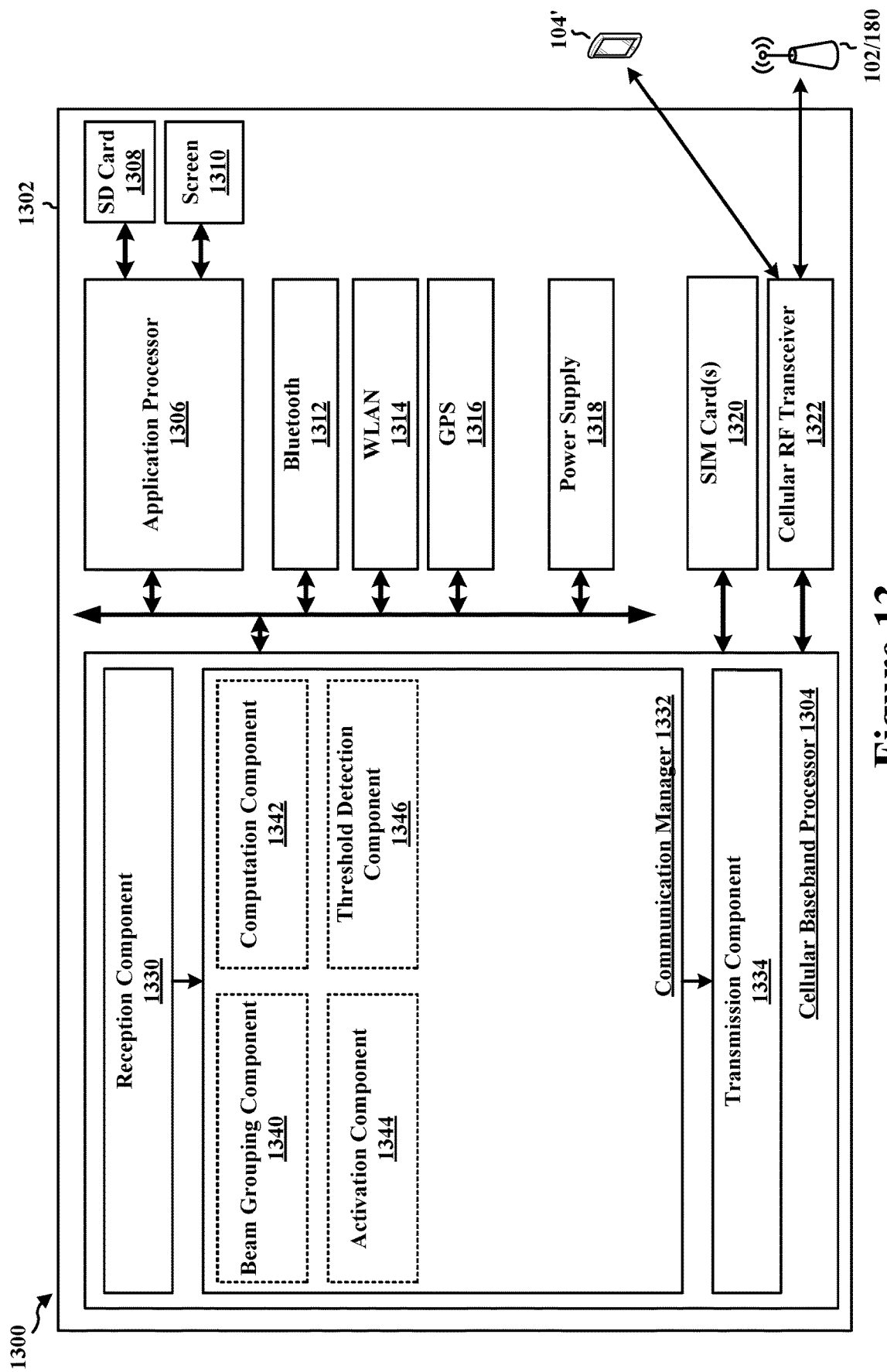
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE that includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a GPS module 1316, and a power supply 1318. The cellular baseband processor 1304 communicates through the cellular RF transceiver 1322 with the UE 104 or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described herein. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory or configured as hardware within the cellular baseband processor 1304. The cellular baseband processor 1304 may be a component of the UE 350 and may include the memory 360 and at least one of the TX processor 368, the RX processor 356, and the controller/processor 359. In one configuration, the apparatus 1302 may be a modem chip and include just the baseband processor 1304, and in another configuration, the apparatus 1302 may be the entire UE (such as the UE 350 of FIG. 3) and include the aforementioned additional modules of the apparatus 1302.

The apparatus 1302 may receive information from at least one of a UE 104' or a base station 102/180 using the reception component 1330. Additionally or alternatively, the apparatus 1302 may transmit information to at least one of the UE 104' or the base station 102/180 using the transmission component 1334. The reception component 1330 may provide received information to the communication manager 1332, and transmission component 1334 may be provided information to be transmitted from the communication manager 1332.

The communication manager 1332 may include a beam grouping component 1340 that is configured to select a first beam group of one or more beam groups to include a first beam of a set of beams, with the first beam group including a first subset of beams of the set of beams that is directionally associated with a first direction of the first beam, such as described in connection with 1102 of FIG. 11 or in connection with 1202 of FIG. 12.

The communication manager 1332 may further include a computation component 1342 that receives input(s) indicating the one or more beam groups from the beam grouping component 1340. The computation component 1342 may be configured to associate a respective set of properties with each of the one or more beam groups, such as described in connection with 1104 of FIG. 11 or in connection with 1204 of FIG. 12.

The communication manager 1332 may further include an activation component 1344 that is configured to activate a second beam having a second direction, such as described in connection with 1206 of FIG. 12. The activation component 1344 may provide input(s) of at least one activated beam(s) to the beam grouping component 1340. The beam grouping component 1340 may be further configured to select a second beam group of the one or more beam groups to include the second beam, with the second beam group including a second subset of beams that is directionally associated with the second direction of the second beam, such as described in connection with 1208 of FIG. 12.

The beam grouping component 1340 may be further configured to select at least one third beam group of the one or more beam groups to include at least a third beam of the set of beams when a fourth beam is deactivated, such as described in connection with 1210 of FIG. 12.

The beam grouping component 1340 may be further configured to merge at least two other beam groups to define a fourth beam group of the one or more beam groups, such as described in connection with 1212 of FIG. 12. The fourth beam group may be selected to include at least one beam from each of the at least two other beam groups.

The beam grouping component 1340 may be further configured to split at least one other beam group into at least a fifth beam group and a sixth beam group of the one or more beam groups, such as described in connection with 1214 of FIG. 12. For example, the at least one other beam group may have been included in previously defined beam groups, but may be absent from the one or more beam groups that is current or relevant. The fifth beam group may be selected to include at least one beam from the at least one other beam group that is different from the sixth beam group.

The computation component 1342 may be further configured to compute the at least one CBR, CR, or CR threshold associated with a seventh beam group of the one or more beam groups using at least one other CBR, at least one other CR, or at least one other CR threshold associated with at least one other beam group, such as described in connection with 1216 of FIG. 12.

The communication manager 1332 may further include a threshold detection component 1346 that receives input(s) indicating the one or more beam groups from the beam grouping component 1340 and indicating the respective sets of properties (such as at least one CBR, CR, or CR threshold) from the computation component 1342. The threshold detection component 1346 may be configured to compare the CR associated with an eighth beam group of the one or more beam groups to the CR threshold associated with the eighth beam group, such as described in connection with 1218 of FIG. 12. When the threshold detection component 1346 detects that the respective CR threshold is satisfied by the CR for the eighth beam group according to the comparison, at least one of the transmission component 1334 or the reception component 1330 may refrain from transmission or reception, respectively, via each beam of an eighth subset of beams of the eighth beam group, such as described in connection with 1220 of FIG. 12.

Further, at least one of the reception component 1330 or the transmission component 1334 may be configured to communicate via the first beam of the first beam group of the one or more beam groups, such as described in connection with 1106 of FIG. 11 or in connection with 1222 of FIG. 12.

The apparatus 1302 may include additional components that perform some or all of the blocks, operations, signaling, etc. of the algorithm(s) in the aforementioned flowcharts of FIGS. 11 and 12. As such, some or all of the blocks, operations, signaling, etc. in the aforementioned flowcharts of FIGS. 11 and 12 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for selecting a first beam group of one or more beam groups to include a first beam of a set of beams, with the first beam group to include a first subset of beams of the set of beams that is directionally associated with a first direction of the first beam; means for associating a respective set of properties with each of the one or more beam groups; and means for communicating via the first beam.

In one configuration, each of the set of beams is active.

In one configuration, the apparatus 1302, and in particular the cellular baseband processor 1304, may further include means for activating a second beam, the second beam having a second direction; and means for selecting a second beam group of the one or more beam groups to include the second beam, with the second beam group including a second subset of beams that is directionally associated with the second direction of the second beam.

In one configuration, the second beam group is selected using at least one third beam group.

In one configuration, the apparatus 1302, and in particular the cellular baseband processor 1304, may further include means for selecting at least one second beam group of the one or more beam groups to include at least one second beam of the set of beams that is active when a third beam is deactivated, with the third beam being absent from each of the one or more beam groups when deactivated.

In one configuration, the respective set of properties associated with each of the one or more beam groups includes at least one of a CBR, a CR, or a CR threshold.

In one configuration, the apparatus 1302, and in particular the cellular baseband processor 1304, may further include means for comparing the CR associated with a second beam group of the one or more beam groups to the CR threshold associated with the second beam group; and means for refraining from at least one of transmission or reception via each of a second subset of beams of the second beam group when the comparing of the CR associated with the second beam group to the CR threshold associated with the second beam group indicates the CR satisfies the CR threshold.

In one configuration, each of the first subset of beams of the first beam group includes a transmission beam, and the CBR is associated with the first beam group using feedback information received via at least one beam of the first subset of beams.

In one configuration, each of the first subset of beams of the first beam group includes a reception beam, and the CBR is associated with the first beam group using SCI received via at least one beam of the first subset of beams.

In one configuration, the apparatus 1302, and in particular the cellular baseband processor 1304, may further include means for computing the at least one of the CBR, the CR, or the CR threshold with a second beam group of the one or more beam groups using at least one other CBR, at least one other CR, or at least one other CR threshold associated with at least one third beam group.

In one configuration, the at least one of the CBR, the CR, or the CR threshold is associated with the second beam group of the one or more beam groups using a fraction of the at least one other CBR, at least one other CR, or at least one other CR threshold associated with the at least one third beam group.

In one configuration, the at least one of the CBR, the CR, or the CR threshold is associated with the second beam group of the one or more beam groups using at least one comparison between at least two other CBRs, at least two other CRs, or at least two other CR thresholds respectively associated with at least two beam groups of the at least one third beam group.

In one configuration, the apparatus 1302, and in particular the cellular baseband processor 1304, may further include means for merging at least two other beam groups to define a second beam group of the one or more beam groups, with the second beam group being selected to include at least one beam from each of the at least two other beam groups.

In one configuration, the apparatus 1302, and in particular the cellular baseband processor 1304, may further include means for splitting at least one other beam group into at least a second beam group and a third beam group of the one or more beam groups, with the second beam group being selected to include at least one beam from the at least one other beam group that is absent from the third beam group.

In one configuration, the first subset of beams of the first beam group is directionally associated with the first direction of the first beam in one of a global coordinate system or a relative coordinate system associated with the apparatus 1302.

In one configuration, at least one second beam group of the one or more beam groups is further selected to include the first beam, and a second subset of beams of the second beam group is directionally associated with the first direction of the first beam, with the first subset of beams including at least one beam that is absent from the second subset of beams.

The aforementioned means may be one or more of the aforementioned components of the apparatus 1302 configured to perform the functions recited by the aforementioned means. As described herein, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with any of the various aspects or teachings described herein, without limitation.

Implementation examples are described in the following numbered clauses:

1. A method of wireless communication by a UE, including:
    selecting a first beam group of one or more beam groups to include a first beam of a set of beams, with the first beam group to include a first subset of beams of the set of beams that is directionally associated with a first direction of the first beam;
    associating a respective set of properties with each of the one or more beam groups; and
    communicating via the first beam.

2. The method of clause 1, with each of the set of beams being active.

3. The method of clause 1 or 2, further including:
    activating a second beam, with the second beam having a second direction; and
    selecting a second beam group of the one or more beam groups to include the second beam, with the second beam group including a second subset of beams that is directionally associated with the second direction of the second beam.

4. The method of clause 3, with the second beam group being selected using at least one third beam group.

5. The method of clause 1 or 2, further including:
    selecting at least one second beam group of the one or more beam groups to include at least one second beam of the set of beams that is active when a third beam is deactivated, with the third beam being absent from each of the one or more beam groups when deactivated.

6. The method of any of clauses 1 through 5, with the respective set of properties associated with each of the one or more beam groups including at least one of a CBR, a CR, or a CR threshold.

7. The method of clause 6, further including:
    comparing the CR associated with a second beam group of the one or more beam groups to the CR threshold associated with the second beam group; and
    refraining from at least one of transmission or reception via each of a second subset of beams of the second beam group when the comparing of the CR associated with the second beam group to the CR threshold associated with the second beam group indicates the CR satisfies the CR threshold.

8. The method of clause 6 or 7, with each of the first subset of beams of the first beam group including a transmission beam, and the CBR being associated with the first beam group using feedback information received via at least one beam of the first subset of beams.

9. The method of clause 6 or 7, with each of the first subset of beams of the first beam group including a reception beam, and the CBR is associated with the first beam group using SCI received via at least one beam of the first subset of beams.

10. The method of any of clauses 6 through 9, further including:
    computing the at least one of the CBR, the CR, or the CR threshold associated with a second beam group of the one or more beam groups using at least one other CBR, at least one other CR, or at least one other CR threshold associated with at least one third beam group.

11. The method of clause 10, with the at least one of the CBR, the CR, or the CR threshold is associated with the second beam group of the one or more beam groups using a fraction of the at least one other CBR, at least one other CR, or at least one other CR threshold associated with the at least one third beam group.

12. The method of clause 10, with the at least one of the CBR, the CR, or the CR threshold is associated with the second beam group of the one or more beam groups using at least one comparison between at least two other CBRs, at least two other CRs, or at least two other CR thresholds respectively associated with at least two beam groups of the at least one third beam group.

13. The method of any of clauses 1 through 12, further including:
merging at least two other beam groups to define a second beam group of the one or more beam groups, with the second beam group being selected to include at least one beam from each of the at least two other beam groups.

14. The method of any of clauses 1 through 12, further including:
splitting at least one other beam group into at least a second beam group and a third beam group of the one or more beam groups, with the second beam group being selected to include at least one beam from the at least one other beam group that is absent from the third beam group.

15. The method of any of clauses 1 through 14, with the first subset of beams of the first beam group being directionally associated with the first direction of the first beam in one of a global coordinate system or a relative coordinate system associated with the UE.

16. The method of any of clauses 1 through 15, with at least one second beam group of the one or more beam groups being selected to include the first beam, and a second subset of beams of the second beam group being directionally associated with the first direction of the first beam, and the first subset of beams includes at least one beam that is absent from the second subset of beams.

17. An apparatus for wireless communication by a UE, including:
means for selecting a first beam group of one or more beam groups to include a first beam of a set of beams, with the first beam group to include a first subset of beams of the set of beams that is directionally associated with a first direction of the first beam;
means for associating a respective set of properties with each of the one or more beam groups; and
means for communicating via the first beam.

18. The apparatus of clause 17, with each of the set of beams being active.

19. The apparatus of clause 17 or 18, further including:
means for activating a second beam, with the second beam having a second direction; and
means for selecting a second beam group of the one or more beam groups to include the second beam, with the second beam group including a second subset of beams that is directionally associated with the second direction of the second beam.

20. The apparatus of clause 19, with the second beam group being selected using at least one third beam group.

21. The apparatus of clause 17 or 18, further including:
means for selecting at least one second beam group of the one or more beam groups to include at least one second beam of the set of beams that is active when a third beam is deactivated, with the third beam being absent from each of the one or more beam groups when deactivated.

22. The apparatus of any of clauses 17 through 21, with the respective set of properties associated with each of the one or more beam groups including at least one of a CBR, a CR, or a CR threshold.

23. The apparatus of clause 22, further including:

means for comparing the CR associated with a second beam group of the one or more beam groups to the CR threshold associated with the second beam group; and
means for refraining from at least one of transmission or reception via each of a second subset of beams of the second beam group when the comparing of the CR associated with the second beam group to the CR threshold associated with the second beam group indicates the CR satisfies the CR threshold.

24. The apparatus of clause 22 or 23, with each of the first subset of beams of the first beam group including a transmission beam, and the CBR being associated with the first beam group using feedback information received via at least one beam of the first subset of beams.

25. The apparatus of clause 22 or 23, with each of the first subset of beams of the first beam group including a reception beam, and the CBR being associated with the first beam group using SCI received via at least one beam of the first subset of beams.

26. The apparatus of any of clauses 22 through 25, further including:
means for computing the at least one of the CBR, the CR, or the CR threshold associated with a second beam group of the one or more beam groups using at least one other CBR, at least one other CR, or at least one other CR threshold associated with at least one third beam group.

27. The apparatus of clause 26, with the at least one of the CBR, the CR, or the CR threshold is associated with the second beam group of the one or more beam groups using a fraction of the at least one other CBR, at least one other CR, or at least one other CR threshold associated with the at least one third beam group.

28. The apparatus of clause 26, with the at least one of the CBR, the CR, or the CR threshold is associated with the second beam group of the one or more beam groups using at least one comparison between at least two other CBRs, at least two other CRs, or at least two other CR thresholds respectively associated with at least two beam groups of the at least one third beam group.

29. The apparatus of any of clauses 17 through 28, further including:
means for merging at least two other beam groups to define a second beam group of the one or more beam groups, with the second beam group being selected to include at least one beam from each of the at least two other beam groups.

30. The apparatus of any of clauses 17 through 28, further including:
means for splitting at least one other beam group into at least a second beam group and a third beam group of the one or more beam groups, with the second beam group being selected to include at least one beam from the at least one other beam group that is absent from the third beam group.

31. The apparatus of any of clauses 17 through 30, with the first subset of beams of the first beam group being directionally associated with the first direction of the first beam in one of a global coordinate system or a relative coordinate system associated with the UE.

32. The apparatus of any of clauses 17 through 31, with at least one second beam group of the one or more beam groups being selected to include the first beam, and a second subset of beams of the second beam group being directionally associated with the first direction of the first beam, and the first subset of beams includes at least one beam that is absent from the second subset of beams.

33. An apparatus for wireless communication by a UE, including:
   a memory; and
   at least one processor coupled to the memory and configured to:
      select a first beam group of one or more beam groups to include a first beam of a set of beams, with the first beam group to include a first subset of beams of the set of beams that is directionally associated with a first direction of the first beam;
      associate a respective set of properties with each of the one or more beam groups; and
      communicate via the first beam.

34. The apparatus of clause 33, with each of the set of beams being active.

35. The apparatus of clause 33 or 34, with the at least one processor being further configured to:
   activate a second beam, with the second beam having a second direction; and
   select a second beam group of the one or more beam groups to include the second beam, with the second beam group including a second subset of beams that is directionally associated with the second direction of the second beam.

36. The apparatus of clause 35, with the second beam group being selected using at least one third beam group.

37. The apparatus of clause 33 or 34, with the at least one processor being further configured to:
   select at least one second beam group of the one or more beam groups to include at least one second beam of the set of beams that is active when a third beam is deactivated, with the third beam being absent from each of the one or more beam groups when deactivated.

38. The apparatus of any of clauses 33 through 37, with the respective set of properties associated with each of the one or more beam groups including at least one of a CBR, a CR, or a CR threshold.

39. The apparatus of clause 38, with the at least one processor being further configured to:
   compare the CR associated with a second beam group of the one or more beam groups to the CR threshold associated with the second beam group; and
   refrain from at least one of transmission or reception via each of a second subset of beams of the second beam group when the comparison of the CR associated with the second beam group to the CR threshold associated with the second beam group indicates the CR satisfies the CR threshold.

40. The apparatus of clause 38 or 39, with each of the first subset of beams of the first beam group including a transmission beam, and the CBR associated with the first beam group is associated using feedback information received via at least one beam of the first subset of beams.

41. The apparatus of clause 38 or 39, with each of the first subset of beams of the first beam group including a reception beam, and the CBR is associated with the first beam group using SCI received via at least one beam of the first subset of beams.

42. The apparatus of any of clauses 38 through 41, with the at least one processor being further configured to:
   compute the at least one of the CBR, the CR, or the CR threshold associated with a second beam group of the one or more beam groups using at least one other CBR, at least one other CR, or at least one other CR threshold associated with at least one third beam group.

43. The apparatus of clause 42, with the at least one of the CBR, the CR, or the CR threshold is associated with the second beam group of the one or more beam groups using a fraction of the at least one other CBR, at least one other CR, or at least one other CR threshold associated with the at least one third beam group.

44. The apparatus of clause 42, with the at least one of the CBR, the CR, or the CR threshold is associated with the second beam group of the one or more beam groups using at least one comparison between at least two other CBRs, at least two other CRs, or at least two other CR thresholds respectively associated with at least two beam groups of the at least one third beam group.

45. The apparatus of any of clauses 33 through 44, with the at least one processor being further configured to:
   merge at least two other beam groups to define a second beam group of the one or more beam groups, with the second beam group being selected to include at least one beam from each of the at least two other beam groups.

46. The apparatus of any of clauses 33 through 44, with the at least one processor being further configured to:
   split at least one other beam group into at least a second beam group and a third beam group of the one or more beam groups, with the second beam group being selected to include at least one beam from the at least one other beam group that is absent from the third beam group.

47. The apparatus of any of clauses 33 through 46, with the first subset of beams of the first beam group being directionally associated with the first direction of the first beam in one of a global coordinate system or a relative coordinate system associated with the UE.

48. The apparatus of any of clauses 33 through 47, with at least one second beam group of the one or more beam groups being selected to include the first beam, and a second subset of beams of the second beam group being directionally associated with the first direction of the first beam, and the first subset of beams includes at least one beam that is absent from the second subset of beams.

49. A computer-readable medium storing computer-executable code for wireless communication by a UE, the code when executed by a processor cause the processor to:
   select a first beam group of one or more beam groups to include a first beam of a set of beams, with the first beam group to include a first subset of beams of the set of beams that is directionally associated with a first direction of the first beam;
   associate a respective set of properties with each of the b3qm one or more beam groups; and
   communicate via the first beam.

50. The computer-readable medium of clause 49, with each of the set of beams being active.

51. The computer-readable medium of clause 49 or 50, further including code, when executed by the processor, to cause the processor to:
   activate a second beam, with the second beam having a second direction; and
   select a second beam group of the one or more beam groups to include the second beam, with the second beam group including a second subset of beams that is directionally associated with the second direction of the second beam.

52. The computer-readable medium of clause 51, with the second beam group being selected using at least one third beam group.

53. The computer-readable medium of clause 49 or 50, further including code, when executed by the processor, to cause the processor to:

select at least one second beam group of the one or more beam groups to include at least one second beam of the set of beams that is active when a third beam is deactivated, with the third beam being absent from each of the one or more beam groups when deactivated.

54. The computer-readable medium of any of clauses 49 through 53, with the respective set of properties associated with each of the one or more beam groups including at least one of a CBR, a CR, or a CR threshold.

55. The computer-readable medium of clause 54, further including code, when executed by the processor, to cause the processor to:
compare the CR associated with a second beam group of the one or more beam groups to the CR threshold associated with the second beam group; and
refrain from at least one of transmission or reception via each of a second subset of beams of the second beam group when the comparing of the CR associated with the second beam group to the CR threshold associated with the second beam group indicates the CR satisfies the CR threshold.

56. The computer-readable medium of clause 54 or 55, with each of the first subset of beams of the first beam group including a transmission beam, and the CBR being associated with the first beam group using feedback information received via at least one beam of the first subset of beams.

57. The computer-readable medium of clause 54 or 55, with each of the first subset of beams of the first beam group including a reception beam, and the CBR is associated with the first beam group using SCI received via at least one beam of the first subset of beams.

58. The computer-readable medium of any of clauses 54 through 57, further including code, when executed by the processor, to cause the processor to:
compute the at least one of the CBR, the CR, or the CR threshold associated with a second beam group of the one or more beam groups using at least one other CBR, at least one other CR, or at least one other CR threshold associated with at least one third beam group.

59. The computer-readable medium of clause 58, with the at least one of the CBR, the CR, or the CR threshold is associated with the second beam group of the one or more beam groups using a fraction of the at least one other CBR, at least one other CR, or at least one other CR threshold associated with the at least one third beam group.

60. The computer-readable medium of clause 58, with the at least one of the CBR, the CR, or the CR threshold is associated with the second beam group of the one or more beam groups using at least one comparison between at least two other CBRs, at least two other CRs, or at least two other CR thresholds respectively associated with at least two beam groups of the at least one third beam group.

61. The computer-readable medium of any of clauses 49 through 60, further including code, when executed by the processor, to cause the processor to:
merge at least two other beam groups to define a second beam group of the one or more beam groups, with the second beam group being selected to include at least one beam from each of the at least two other beam groups.

62. The computer-readable medium of any of clauses 49 through 60, further including code, when executed by the processor, to cause the processor to:
split at least one other beam group into at least a second beam group and a third beam group of the one or more beam groups, with the second beam group being selected to include at least one beam from the at least one other beam group that is absent from the third beam group.

63. The computer-readable medium of any of clauses 49 through 62, with the first subset of beams of the first beam group being directionally associated with the first direction of the first beam in one of a global coordinate system or a relative coordinate system associated with the UE.

64. The computer-readable medium of any of clauses 49 through 63, with at least one second beam group of the one or more beam groups being selected to include the first beam, and a second subset of beams of the second beam group being directionally associated with the first direction of the first beam, and the first subset of beams includes at least one beam that is absent from the second subset of beams.

According to various aspects, as used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, multiple microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include random-access memory (RAM), read-only memory (ROM), electrically erasable programmable ROM (EEPROM), compact-disc ROM (CD-ROM), or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication by a user equipment (UE), comprising:
    selecting a first beam group, from a plurality of beam groups, each of the plurality of beam groups having a respective set of beams, to include a first beam of a set of beams associated with the plurality of beam groups, the first beam group to include a first subset of beams of the set of beams that is directionally associated with a first direction of the first beam;
    associating a respective set of properties including at least one of a channel busy ratio, a channel occupancy ratio, or a channel occupancy ratio threshold to each of the plurality of beam groups, wherein the channel busy ratio is a function of unavailable resources on a channel and a total resources on the channel and the channel occupancy ratio is a function of resources on the channel used by the UE and the total resources on the channel;
    measuring the at least one of the channel busy ratio, the channel occupancy ratio, or the channel occupancy ratio threshold associated with a second beam group of the plurality of beam groups using at least one other channel busy ratio, at least one other channel occupancy ratio, or at least one other channel occupancy ratio threshold associated with at least one third beam group, wherein the at least one of the channel busy ratio, the channel occupancy ratio, or the channel occupancy ratio threshold is associated with the second beam group of the plurality of beam groups using a fraction of the at least one other channel busy ratio, at least one other channel occupancy ratio, or at least one other channel occupancy ratio threshold associated with the at least one third beam group; and
    communicating via the first beam.

2. The method of claim 1, wherein each of the set of beams is active.

3. The method of claim 2, further comprising:
    activating a second beam, the second beam having a second direction; and
    selecting a second beam group of the plurality of beam groups to include the second beam, the second beam group including a second subset of beams that is directionally associated with the second direction of the second beam.

4. The method of claim 3, wherein the second beam group is selected using at least one third beam group.

5. The method of claim 2, further comprising:
    selecting at least one second beam group of the plurality of beam groups to include at least one second beam of the set of beams that is active when a third beam is deactivated, the third beam being absent from each of the plurality of beam groups when deactivated.

6. The method of claim 1, further comprising:
    comparing the channel occupancy ratio associated with a second beam group of the plurality of beam groups to the channel occupancy ratio threshold associated with the second beam group; and
    refraining from at least one of transmission or reception via each of a second subset of beams of the second beam group when the comparing of the channel occupancy ratio associated with the second beam group to the channel occupancy ratio threshold associated with the second beam group indicates the channel occupancy ratio satisfies the channel occupancy ratio threshold.

7. The method of claim 1, wherein each of the first subset of beams of the first beam group comprises a transmission beam, and wherein the channel busy ratio is associated with the first beam group using feedback information received via at least one beam of the first subset of beams.

8. The method of claim 1, wherein each of the first subset of beams of the first beam group comprises a reception beam, and wherein the channel busy ratio is associated with the first beam group using sidelink control information (SCI) received via at least one beam of the first subset of beams.

9. The method of claim 1, further comprising:
merging at least two other beam groups to define a second beam group of the plurality of beam groups,
the second beam group being selected to include at least one beam from each of the at least two other beam groups.

10. The method of claim 1, further comprising:
splitting at least one other beam group into at least a second beam group and a third beam group of the plurality of beam groups,
the second beam group being selected to include at least one beam from the at least one other beam group that is absent from the third beam group.

11. The method of claim 1, wherein the first subset of beams of the first beam group is directionally associated with the first direction of the first beam in one of a global coordinate system or a relative coordinate system associated with the UE.

12. The method of claim 1, wherein at least one second beam group of the plurality of beam groups is further selected to include the first beam, and a second subset of beams of the second beam group is directionally associated with the first direction of the first beam, and wherein the first subset of beams includes at least one beam that is absent from the second subset of beams.

13. The method of claim 1, wherein the communicating via the first beam further comprises selecting a channel for communication using the respective set of properties applied to each of the plurality of beam groups.

14. An apparatus for wireless communication by a user equipment (UE), comprising:
means for selecting a first beam group, from a plurality of beam groups, each of the plurality of beam groups having a respective set of beams, to include a first beam of a set of beams associated with the plurality of beam groups, the first beam group to include a first subset of beams of the set of beams that is directionally associated with a first direction of the first beam;
means for associating a respective set of properties including at least one of a channel busy ratio, a channel occupancy ratio, or a channel occupancy ratio threshold to each of the plurality of beam groups, wherein the channel busy ratio is a function of unavailable resources on a channel and a total resources on the channel and the channel occupancy ratio is a function of resources on the channel used by the UE and the total resources on the channel;
means for measuring the at least one of the channel busy ratio, the channel occupancy ratio, or the channel occupancy ratio threshold associated with a second beam group of the plurality of beam groups using at least one other channel busy ratio, at least one other channel occupancy ratio, or at least one other channel occupancy ratio threshold associated with at least one third beam group, wherein the at least one of the channel busy ratio, the channel occupancy ratio, or the channel occupancy ratio threshold is associated with the second beam group of the plurality of beam groups using a fraction of the at least one other channel busy ratio, at least one other channel occupancy ratio, or at least one other channel occupancy ratio threshold associated with the at least one third beam group; and
means for communicating via the first beam.

15. The apparatus of claim 14, wherein each of the set of beams is active.

16. The apparatus of claim 15, further comprising:
means for activating a second beam, the second beam having a second direction; and
means for selecting a second beam group of the plurality of beam groups to include the second beam, the second beam group including a second subset of beams that is directionally associated with the second direction of the second beam.

17. The apparatus of claim 16, wherein the second beam group is selected using at least one third beam group.

18. The apparatus of claim 15, further comprising:
means for selecting at least one second beam group of the plurality of beam groups to include at least one second beam of the set of beams that is active when a third beam is deactivated, the third beam being absent from each of the plurality of beam groups when deactivated.

19. The apparatus of claim 14, further comprising:
means for comparing the channel occupancy ratio associated with a second beam group of the plurality of beam groups to the channel occupancy ratio threshold associated with the second beam group; and
means for refraining from at least one of transmission or reception via each of a second subset of beams of the second beam group when the comparing of the channel occupancy ratio associated with the second beam group to the channel occupancy ratio threshold associated with the second beam group indicates the channel occupancy ratio satisfies the channel occupancy ratio threshold.

20. The apparatus of claim 14, wherein each of the first subset of beams of the first beam group comprises a transmission beam, and wherein the channel busy ratio is associated with the first beam group using feedback information received via at least one beam of the first subset of beams.

21. The apparatus of claim 14, wherein each of the first subset of beams of the first beam group comprises a reception beam, and wherein the channel busy ratio is associated with the first beam group using sidelink control information (SCI) received via at least one beam of the first subset of beams.

22. The apparatus of claim 14, wherein the means for communicating via the first beam further comprises selecting a channel for communication using the respective set of properties applied to each of the plurality of beam group.

23. An apparatus for wireless communication by a user equipment (UE), comprising:
a memory; and
at least one processor coupled to the memory and configured to:
select a first beam group, from a plurality of beam groups, each of the plurality of beam groups having a respective set of beams, to include a first beam of a set of beams associated with the plurality of beam groups, the first beam group to include a first subset of beams of the set of beams that is directionally associated with a first direction of the first beam;

associate a respective set of properties including at least one of a channel busy ratio, a channel occupancy ratio, or a channel occupancy ratio threshold to each of the plurality of beam groups, wherein the channel busy ratio is a function of unavailable resources on a channel and a total resources on the channel and the channel occupancy ratio is a function of resources on the channel used by the UE and the total resources on the channel;

measure the at least one of the channel busy ratio, the channel occupancy ratio, or the channel occupancy ratio threshold associated with a second beam group of the plurality of beam groups using at least one other channel busy ratio, at least one other channel occupancy ratio, or at least one other channel occupancy ratio threshold associated with at least one third beam group, wherein the at least one of the channel busy ratio, the channel occupancy ratio, or the channel occupancy ratio threshold is associated with the second beam group of the plurality of beam groups using a fraction of the at least one other channel busy ratio, at least one other channel occupancy ratio, or at least one other channel occupancy ratio threshold associated with the at least one third beam group; and communicate via the first beam.

24. The apparatus of claim 23, wherein each of the set of beams is active.

25. A non-transitory, computer-readable medium storing computer-executable code for wireless communication by a user equipment (UE), the code when executed by a processor cause the processor to:

select a first beam group, from a plurality of beam groups, each of the plurality of beam groups having a respective set of beams, to include a first beam of a set of beams associated with the plurality of beam groups, the first beam group to include a first subset of beams of the set of beams that is directionally associated with a first direction of the first beam;

associate a respective set of properties including at least one of a channel busy ratio, a channel occupancy ratio, or a channel occupancy ratio threshold to each of the plurality of beam groups, wherein the channel busy ratio is a function of unavailable resources on a channel and a total resources on the channel and the channel occupancy ratio is a function of resources on the channel used by the UE and the total resources on the channel;

measure the at least one of the channel busy ratio, the channel occupancy ratio, or the channel occupancy ratio threshold associated with a second beam group of the plurality of beam groups using at least one other channel busy ratio, at least one other channel occupancy ratio, or at least one other channel occupancy ratio threshold associated with at least one third beam group, wherein the at least one of the channel busy ratio, the channel occupancy ratio, or the channel occupancy ratio threshold is associated with the second beam group of the plurality of beam groups using a fraction of the at least one other channel busy ratio, at least one other channel occupancy ratio, or at least one other channel occupancy ratio threshold associated with the at least one third beam group; and communicate via the first beam.

26. The non-transitory, computer-readable medium of claim 25, wherein the communicating via the first beam further comprises selecting a channel for communication using the respective set of properties applied to each of the plurality of beam group.

* * * * *